United States Patent
Contractor et al.

(10) Patent No.: US 11,479,684 B2
(45) Date of Patent: Oct. 25, 2022

(54) RADIATION CURABLE INKJET INK COMPOSITIONS, PRINTED ARTICLES, AND THERMAL INKJET METHODS OF USING THE SAME

(71) Applicant: Kao Corporation, Tokyo (JP)

(72) Inventors: Muslim Contractor, Mason, OH (US); Stan Nowacki, Batavia, OH (US); Stephen Buchanan, Mason, OH (US); Stephen Cummings, Mason, OH (US)

(73) Assignee: Kao Corporation, Tokyo (JP)

( * ) Notice: Subject to any disclaimer, the term of this patent is extended or adjusted under 35 U.S.C. 154(b) by 133 days.

(21) Appl. No.: 16/977,631

(22) PCT Filed: Apr. 17, 2019

(86) PCT No.: PCT/US2019/027780
§ 371 (c)(1),
(2) Date: Sep. 2, 2020

(87) PCT Pub. No.: WO2019/204371
PCT Pub. Date: Oct. 24, 2019

(65) Prior Publication Data
US 2021/0040338 A1  Feb. 11, 2021

Related U.S. Application Data

(60) Provisional application No. 62/659,367, filed on Apr. 18, 2018.

(51) Int. Cl.
*C09D 11/106* (2014.01)
*B41J 2/175* (2006.01)
(Continued)

(52) U.S. Cl.
CPC ............ *C09D 11/106* (2013.01); *B41J 2/175* (2013.01); *B41J 2/2107* (2013.01);
(Continued)

(58) Field of Classification Search
CPC .... B41J 2/1433; B41J 2/1623; B41J 2202/00; B41J 2202/03; B41J 2/14201; B41J 2/045;
(Continued)

(56) References Cited

U.S. PATENT DOCUMENTS 7,893,127 B2   2/2011   Nagvekar et al.
8,323,749 B2  12/2012   Questel et al.
(Continued)

OTHER PUBLICATIONS

International Search Report and Written Opinion dated Jul. 1, 2019 in PCT/US2019/027780 filed on Apr. 17, 2019.
(Continued)

*Primary Examiner* — Manish S Shah
(74) *Attorney, Agent, or Firm* — Oblon, McClelland, Maier & Neustadt, L.L.P.

(57) ABSTRACT

A radiation curable inkjet ink composition that includes (A) a mono-ethylenically unsaturated oligomer, (B) a mono-ethylenically unsaturated monomer, and (C) a solvent, wherein the radiation curable inkjet ink composition is substantially free of a photoinitiator and wherein a total weight of the mono-ethylenically unsaturated oligomer (A) is less than or equal to the total weight of the mono-ethylenically unsaturated monomer (B). A printed article including the radiation curable inkjet ink composition in cured form, and a method of forming an image with a thermal inkjet printhead are also provided.

21 Claims, 1 Drawing Sheet

(51) Int. Cl.
*B41M 5/00* (2006.01)
*B41M 5/50* (2006.01)
*C09D 11/101* (2014.01)
*C09D 11/36* (2014.01)
*C09D 11/38* (2014.01)
*B41J 2/21* (2006.01)

(52) U.S. Cl.
CPC ............ *B41M 5/0023* (2013.01); *B41M 5/50* (2013.01); *C09D 11/101* (2013.01); *C09D 11/36* (2013.01); *C09D 11/38* (2013.01)

(58) Field of Classification Search
CPC .. B41J 11/0015; B41J 11/002; B41J 2/04581; B41J 2/055; B41J 2/16538; B41J 2002/16502; B41J 2/01; B41J 2/211; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033
See application file for complete search history.

(56) References Cited

U.S. PATENT DOCUMENTS

| | | | |
|---|---|---|---|
| 2002/0198289 A1* | 12/2002 | Gummeson | C09D 11/101 523/400 |
| 2004/0106693 A1 | 6/2004 | Kauffman et al. | |
| 2008/0090930 A1* | 4/2008 | Madhusoodhanan | C09D 11/30 522/182 |
| 2009/0099277 A1* | 4/2009 | Nagvekar | C09D 11/30 526/194 |
| 2010/0227076 A1* | 9/2010 | Yokoi | C09D 11/101 427/504 |
| 2011/0045199 A1 | 2/2011 | Cong | |

OTHER PUBLICATIONS

Extended European Search Report dated Oct. 29, 2021 in European Patent Application No. 19788915.7, 5 pages.

* cited by examiner

RADIATION CURABLE INKJET INK COMPOSITIONS, PRINTED ARTICLES, AND THERMAL INKJET METHODS OF USING THE SAME

BACKGROUND OF THE INVENTION

Field of the Invention

The present invention relates to radiation curable inkjet ink compositions, printed articles, and methods of forming an image on a substrate using the radiation curable inkjet ink compositions.

Discussion of the Background

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Thermal inkjet (TIJ) printing is a desirable technology for printing, coding, and marking as it offers high print resolutions at lower costs than competing technologies in the field, such as continuous inkjet methods. In thermal inkjet printing processes, the print cartridges contain a series of tiny chambers, each containing a heater, which produce ink droplets from thermal vaporization of an ink solvent. In the jetting process, a resistor is heated rapidly to produce a vapor bubble (hence the phrase "bubble jet"), which subsequently ejects a droplet from the orifice. This process is extremely efficient and reproducible and modern TIJ printheads for industrial graphics applications are capable of generating uniform drops of 4 pL or smaller in volume at frequencies of 36 kHz or greater.

However, thermal inkjet printing has had modest acceptance because of poor throw distance, and relatively poor reliability over time. For example, some inkjet inks result in nozzle plate wetting, printhead clogging, kogation, and suffer from poor decap behavior (e.g., decap time), all of which can cause the inks to jet unreliably and result in image quality erosion over time. Loss of print quality can in many cases be recovered by wiping the nozzles or repeated firing. However, if this recovery is not achievable, the image quality will continue to deteriorate.

Although thermal inkjet printing systems have been available for over 30 years, many of the commercial inks rely on aqueous solvents or humectants to reduce the likelihood of the ink drying within the nozzles. However, these aqueous- or humectant-based strategies suffer from long ink dry times and poor adhesion to a variety of substrates. Energy curable inks would be an option. Furthermore, in order to jet properly from thermal printheads, special attention is paid to lowering ink viscosity by using low molecular weight monomers and additives. Such low molecular weight monomers and additives however, often do not cure as completely as higher molecular weight monomers, and thus photoinitiator systems are employed to aid complete curing of low molecular weight ink components. These inks tend to cause unacceptable levels of contamination of packaged products, for example food or pharmaceutical products, stemming from migration of the low molecular weight monomers, additives, and photoinitiator fragments, into the packaged product.

SUMMARY OF THE INVENTION

In view of the forgoing, there is a need for radiation curable inkjet ink compositions for use in thermal inkjet printing methods that are jetted reliably, do not result in nozzle plate wetting, have advantageous decap behavior, and which form cured ink compositions with minimal migration.

Accordingly, it is one object of the present invention to provide novel radiation curable inkjet ink compositions.

It is another object of the present invention to provide novel printed articles which contain cured ink compositions formed from the radiation curable inkjet ink compositions.

It is another object of the present invention to provide novel methods of forming an image on a substrate by applying the radiation curable inkjet ink compositions onto the substrate and exposing to electron beam radiation.

These and other objects, which will become apparent during the following detailed description, have been achieved by the inventors' discovery that nozzle plate wetting, poor decap behavior, nozzle clogging, and the occurrence of migration can be minimized or suppressed by the following ink compositions.

Thus, the present invention provides:

(1) A radiation curable inkjet ink composition, comprising:
(A) a mono-ethylenically unsaturated oligomer;
(B) a mono-ethylenically unsaturated monomer; and
(C) a solvent;
wherein the radiation curable inkjet ink composition is substantially free of a photoinitiator; and
wherein a total weight of the mono-ethylenically unsaturated oligomer (A) is less than or equal to a total weight of the mono-ethylenically unsaturated monomer (B).

(2) The radiation curable inkjet ink composition of (1), wherein the mono-ethylenically unsaturated oligomer (A) is present in an amount of about 8 to about 30 wt. %, based on a total weight of the radiation curable inkjet ink composition.

(3) The radiation curable inkjet ink composition of (1) or (2), wherein the mono-ethylenically unsaturated monomer (B) is present in an amount of about 20 to about 50 wt. %, based on a total weight of the radiation curable inkjet ink composition.

(4) The radiation curable inkjet ink composition of any one of (1) to (3), wherein the solvent (C) is present in an amount of about 30 to about 65 wt. %, based on a total weight of the radiation curable inkjet ink composition.

(5) The radiation curable inkjet ink composition of any one of (1) to (4), wherein the solvent (C) is an organic solvent, or a mixture of two or more organic solvents.

(6) The radiation curable inkjet ink composition of any one of (1) to (5), wherein a weight ratio of the mono-ethylenically unsaturated monomer (B) to the mono-ethylenically unsaturated oligomer (A) is 1:1 to 3:1.

(7) The radiation curable inkjet ink composition of any one of (1) to (6), further comprising (D) a poly-ethylenically unsaturated component.

(8) The radiation curable inkjet ink composition of (7), wherein the poly-ethylenically unsaturated component (D) is present in an amount of about 1 to about 20 wt. %, based on a total weight of the radiation curable inkjet ink composition.

(9) The radiation curable inkjet ink composition of (7) or (8), wherein a weight ratio of the combined weight of the mono-ethylenically unsaturated monomer (B) and the poly-ethylenically unsaturated component (D) to the mono-ethylenically unsaturated oligomer (A) ((B+D)/A) is greater than 1:1 and up to 4:1.

(10) The radiation curable inkjet ink composition of any one of (7) to (9), wherein the poly-ethylenically unsaturated component (D) is a poly-ethylenically unsaturated monomer (D1), a poly-ethylenically unsaturated oligomer (D2), or a mixture thereof.

(11) The radiation curable inkjet ink composition of any one of (1) to (10), further comprising (E) an acrylate ester of a carboxylic acid ester of formula (I)

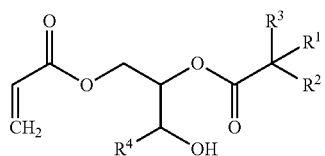

wherein $R^1$, $R^2$, and $R^3$ are each independently an alkyl, an aryl, an alkylaryl, an alkoxyaryl, or a cycloaliphatic group having 1 to 10 carbon atoms, and $R^4$ is a group selected from hydrogen, methyl, ethyl, propyl, butyl, pentyl, hexyl, heptyl, octyl, nonyl, decyl, phenyl, and alkoxy phenyl.

(12) The radiation curable inkjet ink composition of (11), wherein the acrylate ester of a carboxylic acid ester of formula (I) (E) is present in an amount of about 0.5 to about 15 wt. %, based on a total weight of the radiation curable inkjet ink composition.

(13) The radiation curable inkjet ink composition of (11) or (12), wherein $R^1$ and $R^2$ combined have 6 to 8 carbon atoms, $R^3$ is methyl, and $R^4$ is hydrogen.

(14) The radiation curable inkjet ink composition of any one of (11) to (13), wherein a combined weight of the mono-ethylenically unsaturated oligomer (A) and the acrylate ester of a carboxylic acid ester of formula (I) (E) is less than or equal to a total weight of the mono-ethylenically unsaturated monomer (B).

(15) The radiation curable inkjet ink composition of any one of (1) to (14), further comprising (F) an anti-kogation agent.

(16) The radiation curable inkjet ink composition of any one of (1) to (15), further comprising (G) a colorant and/or at least one additive (H) selected from the group consisting of a surfactant, a stabilizer, an adhesion promoter, and a security taggant.

(17) The radiation curable inkjet ink composition of any one of (1) to (16), which exhibits a migration level of less than 10 ppb after being cured on an article.

(18) A printed article, comprising:
a substrate and a cured ink composition on the substrate, wherein the cured ink composition is formed from the radiation curable inkjet ink composition of any one of (1) to (17).

(19) A method of forming an image on a substrate, comprising:
applying a radiation curable inkjet ink composition onto a surface of the substrate by a thermal inkjet printhead, wherein the radiation curable inkjet ink composition comprises
(A) a mono-ethylenically unsaturated oligomer,
(B) a mono-ethylenically unsaturated monomer, and
(C) a solvent,
wherein the radiation curable inkjet ink composition is substantially free of a photoinitiator, and
wherein a total weight of the mono-ethylenically unsaturated oligomer (A) is less than or equal to a total weight of the mono-ethylenically unsaturated monomer (B); and exposing the radiation curable inkjet ink composition to electron beam radiation to at least partially cure the radiation curable inkjet ink composition to form a cured ink composition on the surface of the substrate.

(20) An ink tank, comprising the radiation curable inkjet ink composition of any one of (1) to (17).

BRIEF DESCRIPTION OF THE DRAWINGS

The foregoing paragraphs have been provided by way of general introduction, and are not intended to limit the scope of the following claims. The described embodiments, together with further advantages, will be best understood by reference to the following detailed description when considered in conjunction with the accompanying drawings, wherein:

DETAILED DESCRIPTION OF THE INVENTION

Figure 1:
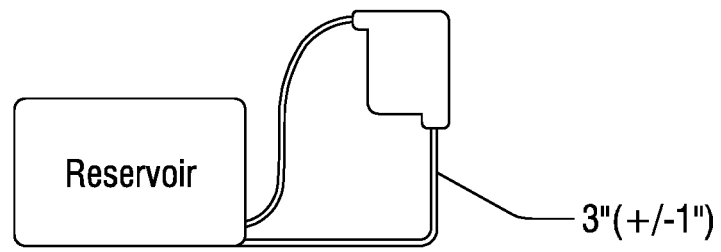
FIG. 1 is an illustration of bulk supply station for vertical (printing down/mailing) applications.

In the following description, it is understood that other embodiments may be utilized and structural and operational changes may be made without departure from the scope of the present embodiments disclosed herein.

The term "curable" describes, for example, an ink composition with an ability to polymerize, harden, and/or cross-link in response to a suitable curing stimulus such as actinic radiation (e.g., ultraviolet (UV) energy, infrared (IR) energy, for example from a light emitting diode (LED)), electron beam (EB) energy, heat energy, or other source of energy. A curable ink composition typically is liquid at 25° C. prior to curing. A curable ink composition can be used to print on a substrate, forming a film of printed ink or coating. The film of curable ink is cured by hardening, polymerizing and/or cross-linking the ink or coating to form a cured ink. The term "radiation curable" refers, for example, to all forms of curing upon exposure to a radiation source, including light sources (e.g., actinic radiation, such as ultraviolet (UV) light, for example having a wavelength of 200-400 nm or more rarely visible light), a heat source in the presence or absence of high-temperature thermal initiators, and an accelerated particle source (e.g., electron beam (EB) radiation) in the presence or absence of initiators, and appropriate combinations thereof.

As used herein, the term "cured" refers to a curable ink composition whereby curable components present in the curable ink composition have undergone polymerization, crosslinking, and/or hardening to form a polymerized or cross-linked network, and includes both partially cured and substantially cured ink compositions. When the curable ink composition cures from a liquid state to a solid state, the curable monomers and/or oligomers form (1) chemical bonds, (2) mechanical bonds, or (3) a combination of a chemical and mechanical bonds. As used herein, "partially cured" or "partially cure" refers to a curable ink composition where 20 to 75 wt. % of the curable functional groups present in the starting composition are polymerized and/or crosslinked, and the term "substantially cured" or "substantially cure" refers to a curable ink composition where more than 75 wt. %, preferably more than 80 wt. %, more preferably more than 90 wt. % of the curable functional groups present in the starting composition undergo conversion (i.e., polymerized and/or crosslinked). Likewise, "at least partially cured" or "at least partially cure" refers to a curable ink composition where at least 20 wt. %, preferably at least 30 wt. %, more preferably at least 40 wt. %, even more preferably at least 50 wt. % (and up to 100 wt. %) of the curable functional groups present in the starting composition have been polymerized and/or crosslinked. The degree of curing described above may be quantified by measuring percent reacted ethylenically unsaturated groups using Fourier Transform Infrared spectroscopy (FTIR).

Suitable ethylenically unsaturated groups that may be cured in the present ink compositions include acrylate, methacrylate, acrylamide, methacrylamide, vinyl, allyl, or other ethylenically unsaturated functional groups. The materials including such groups can be in the form of monomers, oligomers, and/or polymers, or mixtures thereof. As used herein, the term "monomer" is a compound whose molecules can join together to form oligomers or polymers. "Oligomers" as used herein is a polymeric compound containing relatively few repeated structural units (i.e., 2, 3, or 4 repeat units). A "polymer" as used herein is a large molecule, or macromolecule, composed of many repeated structural units (i.e., 5 or more repeat units). Ethylenically unsaturated alkoxylated compounds are excluded from the definition of an oligomer or a polymer and are herein considered monomers unless indicated otherwise. For example, propoxylated neopentyl glycol diacrylate is considered a monomer.

As used herein, "mono-ethylenically unsaturated" refers to components (monomers or oligomers) of the radiation curable inkjet ink compositions which have one ethylenically unsaturated group per molecule, while "poly-ethylenically unsaturated" refers to those components (monomers or oligomers) having two or more (e.g., 2, 3, 4, 5, 6, 7, 8, etc.) ethylenically unsaturated groups per molecule. For example a "mono-ethylenically unsaturated oligomer" refers to an oligomeric material containing one ethylenically unsaturated group that may participate in curing when exposed to a radiation source.

When referencing radiation curable inkjet ink compositions, the phrase "substantially free", unless otherwise specified, describes an amount of a particular component (e.g., a photoinitiator) present in the ink composition being less than about 1 wt. %, preferably less than about 0.5 wt. %, more preferably less than about 0.1 wt. %, even more preferably less than about 0.05 wt. %, yet even more preferably 0 wt. %, relative to a total weight of the radiation curable inkjet ink composition.

As used herein, the terms "optional" or "optionally" means that the subsequently described event(s) can or cannot occur or the subsequently described component(s) may or may not be present (e.g., 0 wt. %).

In inkjet printheads, the nozzle plate is where the ink droplets are formed. Nozzle plate wetting is defined as a buildup of ink around the nozzles of an inkjet printhead which can eventually result in a puddle of ink on the nozzle plate. Nozzle plate wetting of an inkjet composition may be assessed qualitatively visually or through the use of camera systems focused on the nozzle plate or by measuring sustainability, which is indicated by continuous printing without loss of nozzles. Additional discussion regarding sustainability is provided hereinafter.

As used herein, the term "throw distance" is defined as the distance between the printhead and the substrate that can be used whilst still achieving the desired image quality. The throw distance of an inkjet composition may be measured by printing a test pattern with increasing distances between the printhead and the substrate and assessing the quality of the image. This may include printing an image such as a bar code and assessing the grade of the bar code using a bar code verifier, measuring the thickness of a printed line or simply visually assessing the quality of printed image.

The term "decap control," as referred to herein, means the ability of the radiation curable inkjet ink to readily eject from the printhead, upon prolonged exposure to air. The ink "decap time" is measured as the amount of time that an inkjet printhead may be left uncapped before the printer nozzles no longer fire properly, potentially because of clogging or plugging when printing resumes. Generally, nozzle(s) may become clogged (i.e., impeded, slowed) or plugged (i.e., obstructed, substantially or completely closed) by a viscous plug that forms in the nozzle(s) as a result of solvent loss, crusting of the ink, and/or kogation of various ink components in and/or around any of the nozzles. If a nozzle has become clogged, ink droplets ejected through the nozzle's orifice may be misdirected, which may adversely affect print quality. When an orifice is plugged, it becomes substantially or completely blocked. As a result of the nozzle being plugged, the ink droplets may not pass through the affected nozzle. Thus, the criteria for measuring failure to fire by a nozzle is a misdirection of ink through the nozzle's orifice to a lesser or greater degree, or a complete blockage, which can be measured by visually inspecting a printed image or by image clarity instruments known by those of ordinary skill in the art, for example, Personal Image Analysis System™-II (PIAS™-II), available from Quality Engineering Associates (QEA), Massachusetts, USA. In its simplest form, one method involves printing a given test pattern with the printhead nozzles to verify their working condition. This is followed by exposing the nozzles to the air for a fixed time without printing or spitting the nozzles. Then, all of the nozzles are printed again in the given test pattern for the second time. The test patterns are then compared to determine the number of weak or misdirected nozzles. In the worst case, such nozzle clogging or plugging results in a complete failure to fire by the nozzle.

Radiation Curable Inkjet Ink Compositions

The present disclosure is directed to radiation curable inkjet ink compositions that possess suitable physical and chemical stability at both ambient temperatures and printhead operating temperatures, are jetted reliably, do not result in nozzle plate wetting or nozzle clogging, have advantageous decap behavior, and after curing, possess advantageous adhesion properties, rub and scratch resistance, and low migration tendencies. Thus, in addition to providing clear, reliable images with desirable properties, the radiation curable inkjet ink compositions disclosed herein may also increase the longevity of the printing equipment (e.g., the thermal inkjet heads), in terms of longer production runs without the need for intermittent cleaning and in terms of generally extending the life-span of the printing equipment.

Radiation curable inkjet ink compositions of the present disclosure comprise radiation curable materials, which are generally liquids of low volatility, both at ambient temperature and at temperatures employed in the printheads. Such compositions generally include the following components: (A) a mono-ethylenically unsaturated oligomer, (B) a mono-ethylenically unsaturated monomer, (C) a solvent, optionally (D) a poly-ethylenically unsaturated component, optionally (E) an acrylate ester of a carboxylic acid, optionally (F) an anti-kogation agent, optionally (G) a colorant, and optionally (H) an additive.

(A) Mono-Ethylenically Unsaturated Oligomer

Mono-ethylenically unsaturated oligomers generally provide fast curing, strong yet flexible cured films, high elongation, chemical resistance, and advantageous throw distances. Both aliphatic and aromatic mono-ethylenically unsaturated oligomers may be employed herein, for example, acrylates or methacrylates of straight chain, branched chain, or cyclic alkyl alcohols, and aromatic acrylic oligomers, including polyether alcohols thereof. Specific examples include aliphatic monoacrylate oligomers (e.g., CN152, CN130), aromatic monoacrylate oligomers (e.g., CN131), acrylic oligomers (e.g., CN2285) and the like, as well as mixtures thereof. In addition to acrylate or methacrylate groups, the mono-ethylenically unsaturated oligomers employed herein may also possess hydroxyl functionality, for example CN3100 and CN3105. All of the oligomers disclosed above are available from Sartomer Co. Inc. (Exton, Pa.). Preferably, the mono-ethylenically unsaturated oligomer is at least one selected from the group consisting of CN3100, CN3105, and CN131, most preferably CN3100.

The mono-ethylenically unsaturated oligomer may be present in the radiation curable inkjet ink composition in an amount of at least about 8 wt. %, preferably at least about 10 wt. %, preferably at least about 11 wt. %, preferably at least about 12 wt. %, more preferably at least about 13 wt. %, even more preferably at least about 14 wt. %, even more preferably at least about 15 wt. %, yet even more preferably at least about 18 wt. %, and up to about 30 wt. %, preferably up to about 27 wt. %, preferably up to about 25 wt. %, or in a range of 8 to 30 wt. %, preferably 10 to 27 wt. %, more preferably 12 to 25 wt. %, even more preferably 14 to 25 wt. %, based on a total weight of the radiation curable inkjet ink composition.

In some embodiments, the mono-ethylenically unsaturated oligomer has a number average molecular weight of at least about 250 g/mol, preferably at least about 300 g/mol, more preferably at least about 350 g/mol, and up to about 50,000 g/mol, preferably up to about 30,000 g/mol, preferably up to about 10,000 g/mol, more preferably up to about 5,000 g/mol, even more preferably up to about 1,000 g/mol. The viscosity of the mono-ethylenically unsaturated oligomer (A) is typically from about 50 cPs, preferably from about 70 cPs, more preferable from about 90 cPs, and up to about 1,200 cPs, preferably up to about 1,100 cPs, and more preferably up to about 1,000 cPs at 25° C., although viscosities outside of this range are possible and the mono-ethylenically unsaturated oligomers may still function as intended.

(B) Mono-Ethylenically Unsaturated Monomer

Mono-ethylenically unsaturated monomers (B) may increase the chain length of oligomers or otherwise build molecular weight, without excessive crosslinking, contributing to low modulus, high elongation, flexibility, desirable hardness properties, thermal resistance, low shrinkage, improved water resistance, resiliency, and impact resistance of the cured ink compositions.

The mono-ethylenically unsaturated monomer may be an acrylate ester monomer having hydroxyl functionality, an aliphatic or aromatic acrylate ester monomer, and/or a vinyl ether monomer.

Suitable acrylate ester monomers having hydroxyl functionality include hydroxyl functional monoacrylates, or their mono(meth)acrylates of straight chain, branched chain, or cyclic alkyl alcohols, including polyether alcohols. Examples of which include, but are not limited to, hydroxyalkylacrylates and hydroxyalkyl(meth)acrylates wherein the hydroxyalkyl group contains 1 to 12 carbon atoms, preferably 2 to 10 carbon atoms, preferably 3 to 8 carbon atoms. Examples include hydroxyethylacrylate, hydroxyethyl (meth)acrylate, hydroxypropylacrylate, hydroxypropyl (meth)acrylate, hydroxybutylacrylate, hydroxybutyl(meth) acrylate, 2-hydroxy-3-phenyloxypropylacrylate, 2-hydroxy-3-phenyloxypropyl(meth)acrylate, 1,4-butanediol monoacrylate, 1,4-butanediol mono(meth)acrylate, 4-hydroxycyclohexylacrylate, 4-hydroxycyclohexyl(meth)acrylate, 1,6-hexanediol monoacrylate, 1,6-hexanediol mono (meth)acrylate, 2-[(1',1',1'-trifluoro-2'-(trifluoromethyl)-2'-hydroxy)propyl]-3-norbornyl methacrylate, and any combination or subset thereof.

Aliphatic or aromatic acrylate ester monomers for use in radiation curable inkjet ink compositions include, but are not limited to, for example, acrylates and (meth)acrylates of straight chain, branched chain, or cyclic alkyl alcohols, such as alcohols having 1 to 20 carbon atoms, preferably 4 to 16 carbon atoms, including polyether alcohols thereof, as well as acrylates or (meth)acrylates of aromatic, bicyclic or heterocyclic alcohols, optionally containing an aliphatic linking group between the acrylate and the aromatic group, bicycle or heterocycle. Examples of which include, but are not limited to, 3,3,5-trimethylcyclohexyl acrylate (TMCHA) (e.g., SR420), 3,3,5-trimethylcyclohexyl methacrylate (e.g., CD421), 3,5,5-trimethylhexyl acrylate, cyclohexyl methacrylate, phenyl methacrylate, 4-tert-butylcyclohexyl acrylate (Laromer TBCH), dicyclopentadienyl methacrylate (e.g., CD535), diethylene glycol methyl ether methacrylate (e.g., CD545), methoxy polyethylene glycol (550) monoacrylate monomer (CD553), alkoxylated tetrahydrofurfuryl acrylate (e.g., CD611), ethoxylated (4) nonyl phenol methacrylate (e.g., CD612), ethoxylated nonyl phenol acrylate (e.g., CD613), triethylene glycol ethyl ether methacrylate (e.g., CD730), monofunctional acid ester (e.g., CD9050), alkoxylated lauryl acrylate (e.g., CD9075), alkoxylated phenol acrylate (e.g., CD9087), tetrahydrofurfuryl methacrylate (e.g., SR203), isodecyl methacrylate (e.g., SR242), 2-(2-ethoxyethoxy) ethyl acrylate (e.g., SR256), stearyl acrylate (e.g., SR257), tetrahydrofurfuryl acrylate (e.g., SR285), lauryl methacrylate (e.g., SR313A), stearyl methacrylate (e.g., SR324), lauryl acrylate (e.g., SR335), 2-phenoxylethyl acrylate (e.g., SR339), 2-phenoxylethyl methacrylate (e.g., SR340), isodecyl acrylate (e.g., SR395), isobornyl methacrylate (e.g., SR423A), isooctyl acrylate (e.g., SR440), octadecyl acrylate (SR484), tridecyl acrylate (SR489D), tridecyl methacrylate (SR493), caprolactone acrylate (e.g., SR495), ethoxylated (4) nonylphenol acrylate (e.g., SR504), isobornyl acrylate (e.g., SR506A), cyclic trimethylolpropane formal acrylate (e.g., SR531), methoxy polyethylene glycol (350) monomethacrylate (e.g., SR550), and the like. The mono-ethylenically unsaturated monomers may be used singly or in combination of two or more thereof. All of the monomers disclosed above are available from Sartomer Co. Inc. (Exton, Pa.), BASF Dispersions & Resins, North America, or Sigma Aldrich.

In some embodiments, the mono-ethylenically unsaturated monomer is preferably at least one selected from the group consisting of 4-tert-butylcyclohexyl acrylate, isobornyl acrylate, 3,3,5-trimethylcyclohexyl acrylate (TMCHA), and 2-phenoxylethyl acrylate, most preferably 3,3,5-trimethylcyclohexyl acrylate (e.g., SR420).

Vinyl ether monomers may include an aliphatic, aromatic, alkoxy, aryloxy mono-functional vinyl ether and vinyl ether alcohol. Suitable examples include vinyl ethers such as Rapi-cure HBVE, Rapi-cure CVE, Rapi-cure EHVE, all available from Ashland Specialty Company, 4-hydroxymethyl cyclohexylmethyl vinyl ether (Novachem), dodecylvinyl ether, and octadecylvinylether.

The mono-ethylenically unsaturated monomer may be present in the radiation curable inkjet ink composition in an amount of at least about 20 wt. %, preferably at least about 24 wt. %, preferably at least about 26 wt. %, preferably at least about 28 wt. %, more preferably at least about 30 wt. %, even more preferably at least about 32 wt. %, and up to about 50 wt. %, preferably up to about 46 wt. %, preferably up to about 42 wt. %, more preferably up to about 38 wt. %, even more preferably up to about 36 wt. %, or in a range of 20 to 40 wt. %, preferably 23 to 38 wt. %, preferably 24 to 37 wt. %, more preferably 25 to 36 wt. % based on a total weight of the radiation curable inkjet ink composition.

The viscosity of the mono-ethylenically unsaturated monomer (B) is typically from about 2 cPs, preferably from about 3 cPs, more preferable from about 5 cPs, and up to about 300 cPs, preferably up to about 200 cPs, preferably up to about 150 cPs, preferably up to about 145 cPs, and more preferably up to about 140 cPs at 25° C., although viscosities outside of this range are possible and the mono-ethylenically unsaturated monomers may still function as intended.

(C) Solvents

The solvent (C) in the radiation curable inkjet ink compositions may aid bubble formation during the jetting process, resulting in reliable ink jetting when used in amounts described herein in combination with the other disclosed ink components to provide nozzle plate wetting suppression, extended decap time and decap control, blocked nozzle reduction and/or reduction in changes in the drop trajectory. The choice of solvent may thus impact the properties of the cured ink composition (e.g., adhesion properties, rub and scratch resistance, migration tendencies, etc.) even though the solvent may no longer be present, or be present in lesser amounts in the cured ink composition. The amount of solvent (C) present in the radiation curable inkjet ink compositions is typically at least about 25 wt. %, preferably at least about 30 wt. %, preferably at least about 35 wt. %, preferably at least about 40 wt. %, more preferably at least about 45 wt. %, even more preferably at least about 50 wt. %, and up to about 70 wt. %, preferably up to about 68 wt. %, preferably up to about 66 wt. %, more preferably up to about 64 wt. %, even more preferably up to about 62 wt. %, yet even more preferably up to about 60 wt. %, yet even more preferably up to about 55 wt. %, or in a range of 30 to 65 wt. %, preferably 45 to 60 wt. %, more preferably 50 to 55 wt. %, based on a total weight of the radiation curable inkjet ink composition.

The solvent (C) may be water, one or more organic solvents, or a mixture thereof. In some embodiments, the radiation curable inkjet ink compositions are substantially non-aqueous, meaning that no water is added to the radiation curable inkjet ink compositions other than the incidental amounts of moisture derived from ambient conditions. In such embodiments, the radiation curable inkjet ink compositions are substantially free of water and have less than about 3 wt. %, preferably less than about 2 wt. %, preferably less than about 1 wt. %, preferably less than about 0.1 wt. %, preferably less than about 0.05 wt. % of water, based on the total weight of the radiation curable inkjet ink composition.

In preferred embodiments, the solvent (C) is an organic solvent, including two or more organic solvents. Suitable organic solvents include: alcohols, for example alcohols containing 1 to 4 carbon atoms, such as methanol, ethanol, butanol, propanol, and isopropanol; glycol ethers such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-isopropyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-2-methoxybutanol, propylene glycol monomethyl ether, propylene glycol monoethyl ether, propylene glycol mono-t-butyl ether, propylene glycol mono-n-propyl ether, propylene glycol mono-isopropyl ether, propylene glycol mono-n-butyl ether, dipropylene glycol mono-n-butyl ether, dipropylene glycol monomethyl ether, dipropylene glycol monoethyl ether, dipropylene glycol mono-n-propyl ether, and dipropylene glycol mono-iso-propyl ether; ethers (non-glycol ethers), for example ethers containing 4 to 8 carbon atoms such as diethyl ether, dipropyl ether, methyl tert-butyl ether, dibutyl ether, dioxane, and tetrahydrofuran; ketones, for example ketones containing 3 to 6 carbon atoms, including acetone, methyl ethyl ketone and cyclohexanone; esters, including those having 3 to 6 carbon atoms, for example methyl acetate, ethyl acetate, n-butyl acetate, methyl lactate, ethyl lactate; amides such as formamide and acetamide; sulfoxides, for example dimethylsulfoxide; and mixtures of two or more thereof. In particular, alcohols, ketones, and esters have an attractive feature in that they are able to penetrate semi- and non-porous substrate surfaces more readily than water based inks, thus reducing dry time and improving adhesion. Therefore, in preferred embodiments, the solvent (C) is at least one organic solvent selected from an alcohol, a ketone, and an ester, more preferably methanol, ethanol, acetone or a mixture thereof is employed as the solvent (C).

When a mixture of solvents (C), preferably organic solvents, is employed, a weight ratio of solvents in the mixture may be from about 1:10, preferably from about 1:9, preferably from about 1:8, preferably from about 1:7, preferably from about 1:6, preferably from about 1:5, preferably from about 1:4, preferably from about 1:3, preferably from about 1:2, preferably from about 1:1, and up to 10:1, preferably up to about 9:1, preferably up to about 8:1, preferably up to about 7:1, preferably up to about 6:1, preferably up to about 5:1, preferably up to about 4:1, preferably up to about 3:1, preferably up to about 2:1. In most preferred embodiments, a mixture of methanol and ethanol is used in a ratio of about 3:1 to 5:1, more preferably about 4:1. However, weight ratios outside of this range are possible and the radiation curable inkjet ink compositions may still function as intended.

(D) Poly-Ethylenically Unsaturated Component

In some embodiments, the radiation curable inkjet ink composition further includes a poly-ethylenically unsaturated component (D), which includes two or more ethylenically unsaturated groups per molecule, for example di-, tri-, tetra-, penta-, hexa-, hepta-, and octa-ethylenically unsaturated molecules. Poly-ethylenically unsaturated components for use in the radiation curable inkjet ink compositions include, for example, acrylates, (meth)acrylates, or vinyl ethers of straight chain, branched chain, hyperbranched or cyclic alkyl alcohols, including those that are silicone, polyester, or glycol-based acrylates, (meth)acrylates, or vinyl ethers of alcohols. In some embodiments, the radiation curable inkjet ink compositions are substantially free of poly-ethylenically unsaturated components (D). However, when present, the amount of poly-ethylenically unsaturated component present in the radiation curable inkjet ink compositions is typically at least about 1 wt. %, preferably at least about 1.5 wt. %, preferably at least about 2 wt. %, preferably at least about 3 wt. %, and up to about 25 wt. %, preferably up to about 20 wt. %, preferably up to about 15 wt. %, more preferably up to about 10 wt. %, even more preferably up to about 8 wt. %, yet even more preferably up to about 6 wt. %, or in a range of about 2 to 12 wt. %, preferably 3 to 10 wt. %, based on a total weight of the radiation curable inkjet ink composition.

The poly-ethylenically unsaturated component (D) may be a poly-ethylenically unsaturated monomer (D1), a poly-ethylenically unsaturated oligomer (D2), or a mixture thereof (D1+D2).

Suitable poly-ethylenically unsaturated monomers (D1) are typically liquids at a temperature of 25° C., and may provide advantageous viscosity properties. Exemplary poly-ethylenically unsaturated monomers (D1) that may be employed herein include tripropyleneglycol diacrylate, neopentyl glycoldiacrylate, 1,6-hexanediol diacrylate (all available from Sartomer Co. Inc.), acrylates of propoxylated alcohols such as propoxylated (2) neopentyl glycol diacrylate (SR9003B, Sartomer Co. Inc.), acrylates of ethoxylated alcohols such as ethoxylated trimethylolpropane triacrylate (e.g., ethoxylated (6) trimethylolpropane triacrylate (SR499), Low Migration Ethoxylated Trimethylolpropane Triacrylate (SR455LM), each from Sartomer Co. Inc.), triethyleneglycol divinylether (e.g., Rapi-cure DVE 3), cyclohexanedimethanol divinylether, diethyleneglycol divinylether, hexanediol divinylether, butanediol divinylether (all available from Sigma Aldrich), bis[4-(ethenyloxy)butyl] hexanedioic acid ester (VECTOMER 4060), bis[4-(ethenyloxybutyl]ester of 1,3-benzenedicarboxylic acid (VECTOMER 4010), trifunctional vinyl ether monomers (e.g., tris (4-vinyloxybutyl) trimellitate, VECTOMER 5015), all available from Vertellus Performance Materials, Greensboro, N.C. Preferably, when present, acrylates of propoxylated alcohols such as propoxylated (2) neopentyl glycol diacrylate (SR9003B, Sartomer Co. Inc.) are used as the poly-ethylenically unsaturated monomer (D1). Hybrid poly-ethylenically unsaturated monomers containing both acrylate and vinyl ether functionality may also be used, examples of which include, but are not limited to 2-(2-vinylethoxy) ethyl (meth)acrylate, 2-(2-vinyloxyethoxy)-2-propyl (meth) acrylate, 2-(2-vinyloxyethoxy)-3-propyl (meth)acrylate, 2-(2-vinyloxyethoxy)-2-butyl (meth)acrylate, 2-(2-vinyloxyethoxy) 4-butyl (meth)acrylate, 2-(2-allyloxyethoxy) ethyl (meth)acrylate, 2-(2-allyloxyethoxy)-2-propyl (meth) acrylate, 2-(2-allyloxyethoxyxy)-3-propyl (meth)acrylate, 2-(2-allyloxyethoxy)-2-butyl (meth)acrylate, 2-(2-allyloxyethoxy)-4-butyl (meth)acrylate, 2-(2-vinyloxypropoxy)ethyl (meth)acrylate, 2-(2-vinyloxypropoxy)-2-propyl (meth) acrylate, 2-(2-vinyloxypropoxy)-3-propyl (meth)acrylate, 2-(3-vinyloxypropoxy)ethyl (meth)acrylate, 2-(3-vinyloxypropoxy) 2-propyl (meth)acrylate, 2-(3-vinyloxypropoxy)-3-propyl(meth)acrylate, and any combinations or subset thereof. Any of the above poly-ethylenically unsaturated monomers may be used singly or in combination of two or more.

Poly-ethylenically unsaturated oligomers (D2) may optionally be used in the radiation curable inkjet ink compositions to offer toughness, flexibility, abrasion resistance, exterior durability, resistance to yellowing, and other desirable properties to the cured ink compositions. In some embodiments, the poly-ethylenically unsaturated oligomers have a number average molecular weight of at least about 300 g/mol, preferably at least about 500 g/mol, more preferably at least about 800 g/mol, and up to about 50,000 g/mol, preferably up to about 30,000 g/mol, more preferably up to about 10,000 g/mol, even more preferably up to about 5,000 g/mol, yet even more preferably up to about 1,200 g/mol. Exemplary poly-ethylenically unsaturated oligomers (D2) that may be employed herein include diacrylate oligomers (e.g., CN132, CN991, CN962, CN964, and CN966, Sartomer Co. Inc.), tetra-acrylate oligomers (e.g., CN549, Sartomer Co. Inc.), silicone hexa-acrylates (e.g., EBECRYL 1360, Allnex, Belgium), urethane acrylates (e.g., EBECYRL 1290, Allnex, Belgium), polyester acrylate oligomers (e.g., CN2302 and CN2303, Sartomer Co. Inc.), polyether acrylate oligomers (EBECRYL LEO 10551, which is amine modified, available from Allnex, Belgium), polyester acrylate/polyether acrylate blends (e.g., BDE1025, Dymax Corp.), polyester urethane-based oligomers (e.g., CN966J75, which is an aliphatic polyester based urethane diacrylate oligomer blended with 25 wt. % SR506, isobornyl acrylate, available from Sartomer Co. Inc.), aliphatic urethane oligomers (e.g., EBECRYL 8411, which is an aliphatic urethane diacrylate oligomer blended with 20 wt. % isobornyl acrylate, available from Allnex, Belgium, and CN9893, available from Sartomer Co. Inc.), aromatic urethane acrylates (e.g., EBECRYL 220, available from Allnex, Belgium), polyfunctional vinyl ether oligomers (e.g., VECTOMER 1312, Sigma Aldrich), silicone di-acrylates (e.g., CN9800, available from Sartomer Co. Inc., and EBECRYL 350, available from Allnex, Belgium). Most preferably, when employed herein, the poly-ethylenically unsaturated oligomer (D2) is a poly-ester urethane-based oligomers (e.g., CN966J75). These poly-ethylenically unsaturated oligomers may be used singly or in combination of two or more.

In preferred embodiments, the poly-ethylenically unsaturated component (D) is at least one selected from the group consisting of propoxylated (2) neopentyl glycol diacrylate (e.g., SR9003B), ethoxylated (6) trimethylolpropane triacrylate (e.g., SR499), Low Migration Ethoxylated Trimethylolpropane Triacrylate (SR455LM), EBECRYL 8411, CN9893, and/or CN966J75, more preferably SR9003B and/or CN966J75.

In some embodiments, the poly-ethylenically unsaturated component is a mixture of the poly-ethylenically unsaturated monomer (D1) and the poly-ethylenically unsaturated oligomer (D2). Under these circumstances, a weight ratio of the poly-ethylenically unsaturated monomer (D1) to the poly-ethylenically unsaturated oligomer (D2) is typically at least 2:1, preferably at least 3:1, preferably at least 4:1, more preferably at least 5:1, even more preferably at least 6:1, and up to about 10:1, preferably up to about 9:1, more preferably up to about 8:1, even more preferably up to about 7:1, or in a range of about 6:1 to 7:1. However, weight ratios outside of this range are possible and the poly-ethylenically unsaturated component may still provide suitable radiation curable inkjet ink compositions.

(E) Acrylate Ester of a Carboxylic Acid Ester

In some embodiments, the radiation curable inkjet ink composition further includes an acrylate ester of a carboxylic acid ester, which are compounds of the general formula (I) (E)

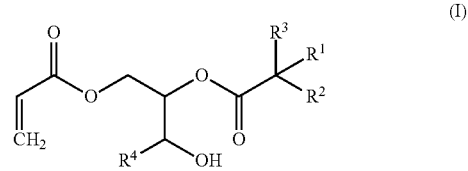

(I)

wherein $R^1$, $R^2$, and $R^3$ are each independently an alkyl, an aryl, an alkylaryl, an alkoxyaryl, or a cycloaliphatic group having 1 to 12 carbon atoms, preferably 1 to 10 carbon atoms, preferably 1 to 8 carbon atoms, preferably 2 to 6 carbon atoms.

The term "alkyl", as used herein, unless otherwise specified, refers to a saturated straight or branched, primary, secondary, or tertiary hydrocarbon and specifically includes, but is not limited to, methyl, ethyl, propyl, isopropyl, butyl, isobutyl, sec-butyl, t-butyl, pentyl, isopentyl, neopentyl, hexyl, isohexyl, 3-methylpentyl, 3-methylbutyl, 1,3-dimethylbutyl, 2,2-dimethylbutyl, and 2,3-dimethylbutyl.

The term "aryl" refers to a carbocyclic aromatic monocyclic group containing 6 carbon atoms which may be further fused to a second 5- or 6-membered carbocyclic group which may be aromatic, saturated or unsaturated. Exemplary aryl groups include, but is not limited to, phenyl, indanyl, 1-naphthyl, 2-naphthyl and tetrahydronaphthyl. "Alkylaryl" or "alkoxyaryl" refers to aryl groups which are substituted with one or more alkyl groups or alkoxy groups, respectively, as defined above.

The term "cycloaliphatic" refers to cyclized alkyl groups having 3 to 12 carbon atoms (i.e., C3, C4, C5, C7, C8, C9, C10, C11, and C12 cycloaliphatic groups). Exemplary cycloaliphatic groups include, but are not limited to, cyclopropyl, cyclobutyl, cyclopentyl, cyclohexyl, norbornyl and adamantyl. Branched cycloaliphatic groups having alkyl substituents, such as 1-methylcyclopropyl and 2-methylcyclopropyl, are included in the definition of "cycloaliphatic".

$R^4$ is a group selected from hydrogen, methyl, ethyl, propyl, butyl, pentyl, hexyl, heptyl, octyl, nonyl, decyl, phenyl, and alkoxy phenyl. In preferred embodiments, $R^4$ is hydrogen.

Although satisfying the definition of a mono-ethylenically unsaturated monomer (B), when present, the acrylate ester of a carboxylic acid ester (E) is considered to be a separate and distinct component employed in the radiation curable inkjet ink compositions of the present disclosure.

The "carboxylic acid ester" moiety in formula (I) is represented by general formula (II)

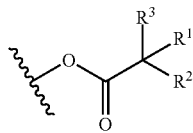

(II)

Representative examples of acids from which the carboxylic acid ester moiety can be derived include α,α-dimethyl-caproic acid, α-ethyl-α-methyl-caproic acid, α,α-diethyl-caproic acid, α,α-diethyl-valeric acid, α,α-dimethyl-capric acid, α-butyl-α-ethyl-capric acid, α,α-dimethyl-enanthic acid, α,α-diethyl-pelargonic acid, α-butyl-α-methyl-caproic acid, α,α-dimethyl-caprylic acid, α-methyl-α-propyl-caproic acid, α-ethyl-α-methyl-enanthic acid, α-methyl-α-propyl valeric acid, α-ethyl-α-methyl-caprylic acid, α-butyl-α-methyl-caprylic acid, α-ethyl-α-propyl-caproic acid, α-ethyl-α-propyl-valeric acid, α-butyl-α-ethyl-pelargonic acid, α,α-dimethyl propionic acid (pivalic acid), neodecanoic acid, which includes one or mixtures of 2,2,3,5-tetramethylhexanoic acid, 2,4-dimethyl-2-isopropylpentanoic acid, 2,5-dimethyl-2-ethylhexanoic acid, 2,2-dimethyloctanoic acid, and 2,2-diethylhexanoic acid, and combinations as well as any subset thereof. Preferred examples of acrylate esters of carboxylic acid esters include but are not limited to acrylate esters of glycidyl esters of neodecanoic acid or acrylate ester of glycidyl ester of pivalic acid and combinations thereof. In preferred embodiments, $R^1$ and $R^2$ combined have a total of 2 to 9 carbon atoms, preferably 4 to 8 carbon atoms, more preferably 6 to 8 carbon atoms, even more preferably 7 carbon atoms, while $R^3$ is methyl, and $R^4$ is hydrogen, for example ACE™ hydroxyl acrylate monomer available from Momentive (Columbus Ohio).

In some embodiments, the radiation curable inkjet ink compositions are substantially free of the acrylate ester of a carboxylic acid ester of formula (I) (E). However, when present, the acrylate ester of a carboxylic acid ester of formula (I) (E) may provide various advantageous properties to the radiation curable inkjet ink compositions. For example, the hydroxyl group may aid adhesion to a variety of substrates, while groups $R^1$-$R^4$ may provide hydrophobicity and increased molecular weight, which generally improves throw distance, decap control, decap time, and migration suppression of the cured ink composition from various substrates. The acrylate ester of a carboxylic acid ester of formula (I) may optionally be present in the radiation curable inkjet ink composition in an amount of at least about 0.5 wt. %, preferably at least about 1 wt. %, preferably at least about 2 wt. %, preferably at least about 3 wt. %, more preferably at least about 4 wt. %, and up to about 20 wt. %, preferably up to about 15 wt. %, preferably up to about 10 wt. %, more preferably up to about 8 wt. %, even more preferably up to about 6 wt. %, or in a range of 2 to 8 wt. %, preferably 3 to 7 wt. %, more preferably 4 to 6 wt. % based on a total weight of the radiation curable inkjet ink composition.

In some embodiments, an acrylate ester monomer having hydroxyl functionality like caprolactone acrylate (e.g., SR495B, available from Sartomer Co. Inc., Exton, Pa.) is employed in lieu of, or in addition to, the acrylate ester of a carboxylic acid ester of formula (I). When a mixture is employed, the weight ratio of the acrylate ester of a carboxylic acid ester of formula (I) to caprolactone acrylate is 10:1 to 1:10, preferably 8:1 to 1:8, preferably, 6:1 to 1:6, even more preferably 5:1 to 1:5, yet even more preferably 3:1 to 1:3.

The viscosity of the acrylate ester of a carboxylic acid ester (E) is typically less than about 300 cPs, preferably less than about 250 cPs, preferably less than about 200 cPs, preferably up to about 150 cPs at 25° C., although viscosities outside of this range are possible and the acrylate ester of a carboxylic acid ester component may still function as intended.

In some embodiments, the proportions of the components described above can be controlled to obtain desirable properties, specifically ink compositions suitable for use in thermal inkjet processes (e.g., jet reliably, do not result in nozzle plate wetting or nozzle clogging, possess advantageous decap behavior, etc.) and which exhibit low levels of migration. In some embodiments, a total weight of the mono-ethylenically unsaturated oligomer (A) is less than or equal to a total weight of the mono-ethylenically unsaturated monomer (B). In preferred embodiments, a weight ratio of the mono-ethylenically unsaturated monomer (B) to the mono-ethylenically unsaturated oligomer (A) is at least about 1:1, preferably at least about 1.3:1, preferably at least about 1.5:1, preferably at least about 1.6:1, preferably at least about 1.7:1, preferably at least about 1.8:1, preferably at least about 2:1, preferably at least about 2.3:1, and up to about 4:1, preferably up to about 3:1, preferably up to about 2.8:1, preferably up to about 2.6:1, more preferably up to about 2.5:1, even more preferable up to about 2.3:1, for example 1.5:1 to 3:1, or 2:1 to 2.5:1.

In radiation curable inkjet ink compositions that also include the poly-ethylenically unsaturated component (D), the proportions of components (A), (B), and (D) described above can be controlled to obtain the aforementioned desirable properties. Preferred proportions involve a weight ratio of the combined weight of the mono-ethylenically unsaturated monomer (B) and the poly-ethylenically unsaturated component (D) to the mono-ethylenically unsaturated oligomer (A) ((B+D)/A) of greater than 1:1, preferably at least 1.5:1, preferably at least 2:1, more preferably at least 2.3:1, even more preferably at least 2.5:1, yet even more preferably at least 3:1, and up to about 5:1, preferably up to about 4:1, preferably up to about 3.5:1, preferably up to about 3:1, more preferably up to about 2.5:1, even more preferably up to about 2.3:1.

In radiation curable inkjet ink compositions that also include the acrylate ester of a carboxylic acid of formula (I) (E), the proportions of components (A), (B), and (E) described above can be controlled to obtain the aforementioned desirable properties. Preferably, the radiation curable inkjet ink compositions have a combined weight of the mono-ethylenically unsaturated oligomer (A) and the acrylate ester of a carboxylic acid ester of formula (I) (E) that is less than or equal to a total weight of the mono-ethylenically unsaturated monomer (B).

In preferred embodiments, the radiation curable inkjet ink composition is substantially free of a photoinitiator, more preferably is completely free of a photoinitiator (e.g., 0 wt. %). Optionally, a photoinitiator may be present in the radiation curable inkjet ink compositions. The photoinitiator may be a cationic photoinitiator, for example in applications that involve printing on substrates where adhesion is difficult, for example glass substrates. The photoinitiator may also be a free-radical photoinitiator. When present, the radiation curable inkjet ink composition may contain less than about 3 wt. %, preferably less than about 2 wt. %, preferably less than about 1 wt. %, preferably less than about 0.5 wt. % of the photoinitiator.

Suitable photocationic initiators that may be optionally included in the radiation curable inkjet ink compositions include onium salts, for example, triarylsulfonium salts or diaryl iodonium salts, such as UVI-6974, UVI-6976, UVI-6990 and UVI 6992 (available from the Dow Chemical Company, Midland, Mich.), ADEKA Optomers SP-150, SP-151, SP-170, and SP-171 (Asahi Denka Kogyo, Tokyo, Japan), Omnicat 550, Omnicat 650, Omnicat BL550, Omnicat 440, Omnicat 445, Omnicat 432, Omnicat 430, Omnicat 750, Omnicat 250 (available from IGM resins, Shanghai, China), and DTS-102, DTS-103, NAT-103, NDS-103, TPS-103, MDS-103, MPI-103, BBI-103 (available from Midori Kagaku, Tokyo, Japan), Chivacure 1176, Chivacure 1190, R-gen BF 1172, R-gen 1130, R-gen 261 (available from Chitec Technology Co. Ltd.,) Uvacure 1600 (available from Allnex), including combinations and sub-sets thereof. Further, in embodiments where a photocationic initiator is present, the radiation curable inkjet ink compositions may also optionally include poly-functional alcohol components such as hexafunctional alcohol BOLTORN H 2004 (available from Perstorp Specialty Chemicals Toledo, Ohio) to provide improved flexibility and reactivity, chemical resistance, rheological behavior, and ink transfer at high speeds.

Additionally, a photosensitizer may optionally be used, for example, to increase the efficiency of curing by the photocationic initiator. Exemplary photosensitizers include, but are not limited to, Anthracure UVS 1101 (9,10-diethoxyanthracene) and Anthracure UVS1331 (9,10-dibutoxyanthracene) made by Kawasaki Kasei, Japan, SpeedCure CPTX(1-chloro-4-propoxythioxanthone), made by Lambson, Ltd, U.K., Genocure ITX (Isopropyl thioxanthone) and Genocure DETX (2,4-Diethylthioxanthone), both available from Rahn USA. When present, the radiation curable inkjet ink composition may contain less than about 3 wt. %, preferably less than about 2 wt. %, preferably less than about 1 wt. % of the photosensitizer.

Suitable free-radical photoinitiators that may be optionally included in the radiation curable inkjet ink compositions include 2-benzyl-2-(dimethylamino)-4'-morpholinobutyrophenone, 2-hydroxy-2-methylpropiophenone, trimethylbenzophenone, methylbenzophenone, 1-hydroxycyclohexylphenyl ketone, isopropyl thioxanthone, 2,2-dimethyl-2-hydroxy-acetophenone, 2,2-dimethoxy-2-phenylacetophenone, 2-methyl-1-[4-(methylthio)phenyl]-2-morpholino-propan-1-one, 2,4,6-trimethylbenzyl-diphenylphosphine oxide, 1-chloro-4-propoxythioxanthone, benzophenone, bis(2,6-dimethoxybenzoyl)-2,4,4-trimethyl pentyl phosphine oxide, 5,7-diiodo-3-butoxy-6-fluorone, ethyl 2,4,6-trimethylben zoylphenylphosphinate, oxy-phenyl-acetic acid 2-[2-oxo-2-phenyl-acetoxy-ethoxy]-ethyl ester and oxy-phenyl acetic acid 2-[2-hydroxy-ethoxy]-ethyl ester, 1-phenyl-2-hydroxy-2-methyl propanone, bis(2,4,6-trimethylbenzoyl)phenylphosphine oxide, camphorquinone, polymeric photoinitiators such as polymeric benzophenone Genopol BP-2 (Rahn U.S.A.), Omnipol BP, Omnipol SZ, Omnipol BL 801 T, Omnipol 801S, Omnipol BPLV (from IGM resins) and the like. Combinations and sub-sets, comprising one or more the foregoing may also be used. Suitable commercially available photoinitiators include, but are not limited to Omnirad 73, Omnirad 819, Omnirad BDK, Omnirad TPO-L, Omnirad 659, and Omnirad 754 (available from IGM Resins), Methyl benzoylformate (Genocure MBF), Genocure PMP, Genocure BDMM, Genocure CPK, Genocure TPO (available from Rahn U.S.A. Corp, Aurora, Ill.), H-Nu 470, H-Nu 535, H-Nu 635, H-Nu 640, and H-Nu 660 (available from Spectra Group Limited, Millbury, Ohio).

The radiation curable inkjet ink compositions of the invention may optionally include, or may be substantially free of non-reactive oligomers (i.e., oligomers which do not contain ethylenically unsaturated radiation curable functional groups), preferably non-reactive oligomers having a number average molecular weight of more than about 10,000 g/mol.

(F) Anti-Kogation Agents

In inkjet printing, repeated firings of resistor elements, which are designed to withstand millions of firings over the life of the print cartridge, result in fouling of the resistor elements with residue and degradation of performance. This build-up of residue is known as kogation. The term "kogation" thus refers to the buildup of the residue, or koga, on a surface of the resistor element in the inkjet pen. "Anti-kogation agents" thus help reduce kogation phenomenon and clogging phenomenon that can happen in internal ink channels, in firing chambers or in nozzles within the inkjet equipment. While not always present in the inks disclosed herein, in some embodiments, the radiation curable inkjet ink composition may further include an anti-kogation agent (F). In general, the anti-kogation agent (F) may optionally be employed in amounts of up to about 10 wt. %, preferably up to about 5 wt. %, preferably up to about 3 wt. %, preferably up to about 2 wt. %, preferably up to about 1 wt. %, preferably up to about 0.5 wt. %, preferably up to about 0.1 wt. %, relative to the total weight of the radiation curable inkjet ink compositions.

The anti-kogation agent (F) may be a phosphate or a phosphate ester, for example, phosphate esters of a fatty alcohol or an alkoxylated fatty alcohol (including mono- and/or di-esters), including salts thereof. Examples of which include ethoxylated mono-oleyl phosphate ester, oleth-3-phosphate, oleth-10 phosphate, oleth-5 phosphate, dioleyl phosphate, a nonylphenol ethoxylate phosphate ester, nonylphenol ethoxylate phosphate ester, an aliphatic phosphate ester, a phosphated nonylphenoxy polyethoxy ethanol, ethyl-hexanol ethoxylated phosphate ester (2EH-2EO), ppg-5-ceteth-10 phosphate, C9-C15 alkyl monophosphate, deceth-4 phosphate, as well as mixtures thereof. The anti-kogation agent (F) may also be an organo-phosphonic acid or a salt thereof, for example, hydroxyethylene di(phosphonic acid) (HEDP), amino tri(methylene phosphonic acid) (ATMP), ethylene diamine tetra(methylene phosphonic acid) (EDTMP), hexamethylene diamine tetra(methylene phosphonic acid) (HDTMP), diethylene triamine penta(methylene phosphonic acid) (DTPMP), and the like, as well as mixtures thereof. In preferred embodiments, the anti-kogation agent (F) is ethylene diamine tetra(methylene phosphonic acid) (EDTMP).

(G) Colorants

In some embodiments, the radiation curable inkjet ink compositions are substantially free of colorants, wherein a colorless coating composition is formed that may be useful in clear-coating applications. All of the disclosures set forth herein relating to the radiation curable inkjet ink compositions, other than the colorant descriptions, is equally applicable to such colorless coating compositions.

The radiation curable inkjet ink compositions may optionally contain a colorant which may comprise pigment, dye, or a combination of pigments and/or dyes to provide the desired color. It is to be readily appreciated by those of ordinary skill in the art that colorants may be included in the radiation curable inkjet ink compositions to provide colored inks that may be used for a variety of printing purposes and the radiation curable inkjet ink compositions are not limited to any particular color. Suitable colors include, for example, cyan, magenta, yellow, and key (black) ("CMYK"), white, orange, green, light cyan, light magenta, violet, and the like, including both spot colors and process colors. In general, the colorants may be employed in amounts of up to about 25 wt. %, preferably up to about 15 wt. %, preferably up to about 10 wt. %, preferably up to about 8 wt. %, preferably up to about 6 wt. %, preferably up to about 4 wt. %, preferably up to about 3 wt. %, preferably up to about 2 wt. %, preferably up to about 1 wt. %, relative to the total weight of the radiation curable inkjet ink compositions. Any desired or effective colorant can be employed in the ink compositions, including dyes, pigments, mixtures thereof, and the like, provided that the colorant can be dissolved or dispersed in the ink compositions. Pigments, which are typically more robust than dyes, may be included in some embodiments. The compositions can be used in combination with conventional ink-colorant materials such as Color Index (C.I.) solvent dyes, disperse dyes, modified acid and direct dyes, basic dyes, sulfur dyes, vat dyes, and the like.

Examples of suitable dyes include Neozapon Red 492 (Pylam Products Co., Inc.); Orasol Red G (BASF); Direct Brilliant Pink B (Zibo Hongwei Industry Co.); Direct Red 3BL (Classic Dyestuffs); Supranol Brilliant Red 3BW (Bayer AG); Lemon Yellow 6G (United Chemie); Light Fast Yellow 3G (Shaanxi); Aizen Spilon Yellow C-GNH (Hodogaya Chemical); Bernachrome Yellow GD Sub (Classic Dyestuffs); Cartasol Brilliant Yellow 4GF (Clariant); Orasol Black CN (BASF); Savinyl Black RLSN (Clariant); Pyrazol Black BG (Clariant); Morfast Black 101 (Keystone); Orasol Blue GN (BASF); Savinyl Blue GLS (Clariant); Luxol Fast Blue MBSN (ACROS); Sevron Blue SGMF (Classic Dyestuffs); Basacid Blue 750 (BASF), Neozapon BlackX51 (BASF), Classic Solvent Black 7 (Classic Dyestuffs), Sudan Blue 670 (C.I. 61554) (BASF), Sudan Yellow 146 (C.I. 12700) (BASF), SudanRed462 (C.I. 26050) (BASF), C.I. Disperse Yellow 238, Neptune Red Base NB543 (BASF, C.I. Solvent Red 49), Neopen Blue FF-4012 from BASF, Lampronol Black BR from ICI (C.I. Solvent Black 35), Morton Morplas Magenta 36 (C.I. Solvent Red 172), metal phthalocyanine colorants such as those disclosed in U.S. Pat. No. 6,221,137, which is incorporated herein by reference in its entirety, and the like. Polymeric dyes can also be used, such as those disclosed in, for example, U.S. Pat. Nos. 5,621,022 and 5,231,135, which are each incorporated herein by reference in its entirety, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactant Orange X-38, uncut Reactant Blue X-17, Solvent Yellow 162, Acid Red 52, Solvent Blue 44, and uncut Reactant Violet X-80.

Pigments are also suitable colorants for the radiation curable inkjet ink compositions. Exemplary pigments include those having the following Color Index classifications: Green PG 7 and 36; Orange PO 5, 34, 36, 38, 43, 51, 60, 62, 64, 66, 67 and 73; Red PR112, 122, 146, 149, 150, 170, 178, 179, 185, 187, 188, 207, 208, 214, 220, 224, 242, 251, 254, 255, 260 and 264; Magenta/Violet PV 19, 23, 31, and 37, and PR 122, 181 and 202; Yellow PY 12, 13, 17, 120, 138, 139, 155, 151, 168, 175, 179, 180, 181 and 185; Blue PB 15, 15:3, 15:4, 15:6; Black PB 2, 5 and 7; carbon black; titanium dioxide (including rutile and anatase); zinc sulfide, and the like. Examples of suitable pigments include PALIOGEN Violet 5100 (commercially available from BASF); PALIOGEN Violet 5890 (commercially available from BASF); HELIOGEN Green L8730 (commercially available from BASF); Irgalite Scarlet D3700 (commercially available from BASF); SUNFAST Blue 15:4 (commercially available from Sun Chemical); Hostaperm Blue B2G-D (commercially available from Clariant); Hostaperm Blue B4G (commercially available from Clariant); Permanent Red P-F7RK; Hostaperm Violet BL (commercially available from Clariant); LITHOL Scarlet 4440 (commercially available from BASF); Bon Red C (commercially available from Dominion Color Company); PALIOGEN Red 3871 K (commercially available from BASF); SUNFAST Blue 15:3 (commercially available from Sun Chemical); PALIOGEN Red 3340 (commercially available from BASF); SUNFAST Carbazole Violet 23 (commercially available from Sun Chemical); LITHOL Fast Scarlet L4300 (commercially available from BASF); SUNBRITE Yellow 17 (commercially available from Sun Chemical); HELIOGEN Blue L6900, L7020 (commercially available from BASF); SUNBRITE Yellow 74 (commercially available from Sun Chemical); SPECTRA PAC C Orange 16 (commercially available from Sun Chemical); HELIOGEN Blue K6902, K6910 (commercially available from BASF); SUNFAST Magenta 122 (commercially available from Sun Chemical); HELIOGEN Blue D6840, D7080 (commercially available from BASF); Sudan Blue OS (commercially available from BASF); NEOPEN Blue FF4012 (commercially available from BASF); PV Fast Blue B2GO 1 (commercially available from Clariant); IRGALITE Blue BCA, GLSM, or GLVO (commercially available from BASF); PALIOGEN Blue 6470 (commercially available from BASF); MONAS- TRAL BLUE FGX, GBX, GLX, a 6Y, Sudan Orange G (commercially available from Aldrich), Sudan Orange 220 (commercially available from BASF); PALIOGEN Orange 3040 (BASF); PALIOGEN Yellow 152, 1560 (commercially available from BASF); LITHOL Fast Yellow 0991 K (commercially available from BASF); PALIOTOL Yellow 1840 (commercially available from BASF); NOVO PERM Yellow FGL (commercially available from Clariant); Ink Jet Yellow 4G VP2532 (commercially available from Clariant); Toner Yellow HG (commercially available from Clariant); Lumogen Yellow D0790 (commercially available from BASF); Suco-Yellow L1250 (commercially available from BASF); Suco-Yellow D1355 (commercially available from BASF); Suco Fast Yellow DI 355, DI 351 (commercially available from BASF); HOSTAPERM Pink E 02 (commercially available from Clariant); Hansa Brilliant Yellow 5GX03 (commercially available from Clariant); Permanent Yellow GRL 02 (commercially available from Clariant); Permanent Rubine L6B 05 (commercially available from Clariant); FANAL Pink D4830 (commercially available from BASF); CINQUASIA Magenta (commercially available from BASF); PALIOGEN Black L0084 (commercially available from BASF); Pigment Black K801 (commercially available from BASF); and carbon blacks such as REGAL 330 (commercially available from Cabot), NIPEX 150, NIPEX 160, NIPEX 180 (commercially available from Orion Engineered Carbons), SPECIAL BLACK 100, SPECIAL BLACK 250, SPECIAL BLACK 350, FW1, FW2 FW200, FW18, SPECIAL BLACK 4, SPECIAL BLACK 5, SPECIAL BLACK 6, PRINTEX 80, PRINTEX 90, PRINTEX 140, PRINTEX 150T, PRINTEX 200, PRINTEX U, and PRINTEX V, all available from Orion Engineered Carbons, MOGUL L, REGAL 400R, REGAL 330, and MONARCH 900, available from Cabot Chemical Co., Boston, Mass., MA77, MA7, MA8, MA11, MA100, MA100R, MA100S, MA230, MA220, MA200RB, MA14, #2700B, #2650, #2600, #2450B, #2400B, #2350, #2300, #2200B, #1000, #970, #3030B, and #3230B, all available from Mitsubishi, Tokyo, Japan, RAVEN 2500 ULTRA, from Birla Carbon-Columbian, and the like, as well as mixtures thereof.

A number of titanium oxide pigments are also known. Nanostructured titania powders may be obtained, for example, from Nanophase Technologies Corporation, Burr-Ridge, III, or under the trade names KRONOS 1171 from Kronos Titan, Cranbury, N.J. Surface treated or surface coated titania, for example titania coated with alumina or silica, may also be used. This type of coated titanium oxide is commercially available from E.I. du Pont de Nemours and Company, Wilmington, Del., under the trade name R960 or R902.

The pigments generally are of a size that can be jetted from a printhead without substantially clogging print nozzles, capillaries, or other components of print equipment. Pigment size can also have an effect on the final ink viscosity. The average particle size of the pigment is generally at least about 10 nm, preferably at least about 25 nm, more preferably at least about 50 nm, and less than about 750 nm, preferably less than about 500 nm, and more preferably less than about 350 nm. For example, the pigments can have a D50 of less than or equal to 350 nm. Laser diffraction methods may be used to measure the average particle size. Alternatively scanning electron microscopy may be used.

Also suitable are the colorants disclosed in U.S. Pat. Nos. 6,472,523, 6,726,755, 6,476,219, 6,576,747, 6,713,614, 6,663,703, 6,755,902, 6,590,082, 6,696,552, 6,576,748, 6,646,111, 6,673,139, 6,958,406, 6,821,327, 7,053,227, 7,381,831 and 7,427,323, which are each incorporated herein by reference in their entirety.

(H) Additives

In some embodiments, the radiation curable inkjet ink compositions also contain at least one additive selected from the group consisting of a surfactant, a stabilizer, an adhesion promoter, and a security taggant.

Surfactants

A surfactant is generally used to lower the surface tension of the composition to allow wetting and leveling of the substrate surface, if necessary, before curing. The surfactant can be selected by both its hydrophobic and hydrophilic properties. In some embodiments, the surfactants may be miscible with the radiation curable material (i.e., acrylate or methacrylate miscible). Surfactants suitable for use in the radiation curable inkjet ink compositions include, but are not limited to, polysiloxanes, polyacrylic copolymers, fluorine containing polymers, and the like. These surfactants may include one or more functional group such as carbinol, alkyl, aryl, glycol, polyether, siloxane, and mixtures thereof. In some embodiments, these materials contain reactive groups that allow them to become part of the cured network. Suitable surfactants may include, but are not limited to polydimethylsiloxane copolymer (Siltech C-20, C-42, C-468), alkyl and aryl modified polydimethylsiloxane (Siltech C-32), silicone polyether (Siltech C-101, 442), block copolymer of dimethylsiloxane and a polyoxyalkylene (Siltech C-241, available from Siltech Corporation), Rad 2100, Rad 2200, Rad 2250, Rad 2300, Rad 2500, Rad 2600, and Rad 2700 commercially available from Evonik Industries AG; CoatOSil 1211, CoatOSil 1301, CoatOSil 3500, CoatOSil 3503, CoatOSil 3509, and CoatOSil 3573 commercially available from Momentive; Byk-381, Byk-333, Byk-361N, Byk-377, Byk-UV 3500, Byk-UV 3510, and Byk-UV 3530 commercially available from Byk Chemie; and FC-4430 and FC-4432 commercially available from 3M Corporation, and the like, and mixtures thereof.

The surfactants may be employed in an amount of about 0 wt. %, preferably from about 0.001 wt. %, more preferably from about 0.005 wt. %, even more preferably from 0.1 wt. %, and up to about 10 wt. %, preferably up to 5 wt. %, preferably up to about 4 wt. %, more preferably up to about 3 wt. %, even more preferably up to about 2 wt. %, based on the total weight of the radiation curable inkjet ink composition.

Stabilizer

The ink formulations of the present invention may also optionally include a stabilizer to aid aerobic and/or anaerobic stability. Examples include but are not limited to Irgastab UV 10, Irgastab UV 22, Irganox 1010, Irganox 1035, and Tinuvin 292 (available from BASF), Omnistab LS292 (available from IGM Resins, Shanghai, China), 4-methoxyphenol, HQ (hydroquinone) and BHT (butylated hydroxyl toluene) commercially available from Sigma-Aldrich Corp. Other types of stabilizers, such as ultraviolet light absorbing ("UVA") materials and hindered amine light stabilizers ("HALS") can be included in the radiation curable inkjet ink compositions to provide photolytic stability to the ink, improve the weatherability of the cured ink compositions, and to provide color retention through the lifetime of the cured ink composition. Exemplary UVAs which can be employed herein include, but are not limited to, Tinuvin 384-2, Tinuvin 1130, Tinuvin 405, Tinuvin 41 IL, Tinuvin 171, Tinuvin 400, Tinuvin 928, Tinuvin 99, combinations thereof, and the like. Examples of suitable HALS include, but are not limited to, Tinuvin 123, Tinuvin 292, Tinuvin 144, Tinuvin 152, combinations thereof, and the like. Combination materials having both UVA and HALS may also be used in the radiation curable inkjet ink compositions, such as Tinuvin 5055, Tinuvin 5050, Tinuvin 5060, Tinuvin 5151, and the like. All Tinuvin products are commercially available from BASF.

Thermal stabilizers such as hindered phenols may optionally be used as an additive in the radiation curable inkjet ink compositions. An example of a suitable thermal stabilizer includes, but is not limited to, Irganox 1076, which is commercially available from BASF.

The stabilizers can be present in the radiation curable inkjet ink compositions in an amount of about 0 to about 10 wt. %, preferably from about 0.001 wt. %, preferably from about 0.01 wt. %, more preferably from about 0.1 wt. %, and even more preferably from about 0.5 wt. %, and up to about 10 wt. %, preferably up to about 5 wt. %, preferably up to about 3 wt. %, more preferably up to about 2 wt. %, even more preferably up to about 1 wt. %, based on the total weight of the radiation curable inkjet ink composition.

Adhesion Promoter

The radiation curable inkjet ink composition may optionally include one or more adhesion promoters. In some instances, the adhesion promoter contains one or more acrylate groups. The adhesion promoter can be an amine modified adhesion promoter. Exemplary amine modified adhesion promoters include amine modified polyether acrylate oligomer (e.g., Laromer PO 94 F (BASF Corp.) and EB 80 (Cytec Surface Specialties)), amine modified polyester tetraacrylate (e.g., EB81 (Cytec Surface Specialties)), and amine modified epoxy acrylate. The adhesion promoter may be a polyurethane, for example polyurethanes sold by Henry Company under the trade names PERMAX 20, PERMAX 200, PERMAX 100, PERMAX 120, and SANCURE 20025, or SANCURE commercially available from Lubrizol.

Generally, if present, the amount of adhesion promoter is from about 0.05 wt. %, preferably from about 1 wt. %, more preferably from about 3 wt. %, and up to about 15 wt. %, preferably up to about 10 wt. %, more preferably up to about 5 wt. %. based on the total weight of the radiation curable inkjet ink composition.

Security Taggant

To prevent counterfeiting or unauthorized photocopying, the radiation curable inkjet ink compositions may optionally include a security taggant. When used, the security taggants are generally employed with loadings of up to about 20 wt. %, preferably up to about 15 wt. %, preferably up to about 10 wt. %, preferably up to about 5 wt. %, preferably up to about 4 wt. %, preferably up to about 3 wt. %, preferably up to about 2 wt. %, preferably up to about 1 wt. %, preferably up to about 0.5 wt. %, relative to the total weight of the radiation curable inkjet ink compositions. Although the amount of the security taggant is generally within this range, the amount of security taggant can be varied outside of these ranges depending on the mode of detection, for example more security taggant may be required for easy detection by the naked eye. On the other hand, if detection is done via a machine read then lower loadings may be used. For use in the thermal inkjet printing methods described herein, the security taggants preferably have a particle size of less than 5 µm, preferably less than 1 µm, preferably less than 0.9 µm, preferably less than 0.8 µm, preferably less than 0.7 µm, preferably less than 0.5 µm, or in a range of about 0.01 to 1 µm, preferably 0.1 to 0.5 µm.

Exemplary security taggants that can be used herein include: naked rare earth (RE) sulfide fused quantum dot, and its glass encapsulated counterparts; naked RE-yttrium co-doped sulfide quantum dot, and their glass encapsulated counterparts; glass encapsulated RE oxide nanocomposite; glass encapsulated RE fluoride nanocomposite; glass encapsulated RE chloride nanocomposite; RE-yttrium co-doped hydroxycarbonate fused quantum dot; holmium doped yttria ceramic; glass encapsulated RE orthophosphates, including holmium orthophosphate ($HoPO_4$) and neodymium orthophosphate ($NdPO_4$) (also referred to as 'holmium phosphate' and 'neodymium phosphate'); naked RE orthophosphates, including holmium phosphate ($HoPO_4$) and neodymium orthophosphate ($NdPO_4$) (also referred to as 'holmium phosphate' and 'neodymium phosphate') as described in US2008/0274028 A1, which is incorporated herein by reference in its entirety. Other useful security taggants include benzothiazoles, rare earth ion chelates such as Eu trifluoroacetate trihydrate, benzoxazins, and benzimidazoles, as described in US2005/0031838 A1, which is incorporated herein by reference in its entirety.

In preferred embodiments, the radiation curable inkjet ink composition includes (A) 12 to 25 wt. % of a hydroxyl-functionalized mono-ethylenically unsaturated oligomer (e.g., CN3100), (B) 20 to 40 wt. % of a mono-ethylenically unsaturated monomer, which is an acrylate of a cyclic alkyl alcohol (e.g., SR420), and (C) 45 to 55 wt. % of an organic solvent, which is a 3:1 to 5:1 ratio of methanol:ethanol, with a balance optionally being (G) colorants and/or at least one (H) additive (e.g., surfactant, a stabilizer, an adhesion promoter and/or a security taggant), each relative to the total weight of the radiation curable inkjet ink composition.

In preferred embodiments, the radiation curable inkjet ink composition includes (A) 12 to 25 wt. % of a hydroxyl-functionalized mono-ethylenically unsaturated oligomer (e.g., CN3100), (B) 25 to 35 wt. % of a mono-ethylenically unsaturated monomer, which is an acrylate of a cyclic alkyl alcohol (e.g., SR420), (C) 45 to 55 wt. % of an organic solvent, which is a 3:1 to 5:1 ratio of methanol:ethanol, (E) 2 to 10 wt. % of the acrylate ester of a carboxylic acid ester of formula (I), with a balance optionally being (G) colorants and/or at least one (H) additive (e.g., surfactant, a stabilizer, an adhesion promoter, and/or a security taggant), each relative to the total weight of the radiation curable inkjet ink composition.

In preferred embodiments, the radiation curable inkjet ink composition includes (A) 12 to 30 wt. % of a hydroxyl-functionalized mono-ethylenically unsaturated oligomer (e.g., CN3100), (B) 20 to 40 wt. % of a mono-ethylenically unsaturated monomer, which is an acrylate of a cyclic alkyl alcohol (e.g., SR420), (C) 30 to 55 wt. % of an organic solvent, which is a 3:1 to 5:1 ratio of methanol:ethanol, (D) 5 to 15 wt. % of a poly-ethylenically unsaturated component, which is (D1) an acrylate monomer of a propoxylated alcohol (e.g., SR9003B), with a balance optionally being (G) colorants and/or at least one (H) additive (e.g., surfactant, a stabilizer, an adhesion promoter, and/or a security taggant), each relative to the total weight of the radiation curable inkjet ink composition.

In preferred embodiments, the radiation curable inkjet ink composition includes (A) 12 to 25 wt. % of a hydroxyl-functionalized mono-ethylenically unsaturated oligomer (e.g., CN3100), (B) 23 to 33 wt. % of a mono-ethylenically unsaturated monomer, which is an acrylate of a cyclic alkyl alcohol (e.g., SR420), (C) 50 to 60 wt. % of an organic solvent, which is a 3:1 to 5:1 ratio of methanol:ethanol, (D) 1 to 5 wt. % of a poly-ethylenically unsaturated component, which is (D2) a polyester urethane-based oligomer (e.g., CN966J75), with a balance optionally being (G) colorants and/or at least one (H) additive (e.g., surfactant, a stabilizer, an adhesion promoter, and/or a security taggant), each relative to the total weight of the radiation curable inkjet ink composition.

In preferred embodiments, the radiation curable inkjet ink composition includes (A) 10 to 25 wt. % of a hydroxyl-functionalized mono-ethylenically unsaturated oligomer (e.g., CN3100), (B) 30 to 40 wt. % of a mono-ethylenically unsaturated monomer, which is an acrylate of a cyclic alkyl alcohol (e.g., SR420), (C) 30 to 60 wt. % of an organic solvent, which is a 3:1 to 5:1 ratio of methanol:ethanol, (F) 0.5 to 2 wt. % of an anti-kogation agent, which is ethylene diamine tetra(methylene phosphonic acid) (EDTMP), with a balance optionally being (G) colorants and/or at least one (H) additive (e.g., surfactant, a stabilizer, an adhesion promoter, and/or a security taggant), each relative to the total weight of the radiation curable inkjet ink composition.

Embodiments of the radiation curable inkjet ink compositions described herein may be prepared by any suitable technique known to those of ordinary skill in the art, for example by combining components (A), (B), and (C) and optionally (D), (E), and/or (F), in any order and stirring at a temperature between 20 and 100° C. until a homogeneous solution is formed. Any desired colorants (G) and an additives (H) may also be included in this mixture, or alternatively be mixed into the homogeneous solution with optional stirring, agitating, and/or homogenization. The formed radiation curable inkjet ink compositions may then be filtered, optionally at an elevated temperature, to remove extraneous particles.

Properties

The radiation curable inkjet ink compositions disclosed herein are suitable for use in thermal inkjet processes and have advantageous properties, for example, viscosity, surface tension, long throw distance, and decap behavior (e.g., long decap times), and after curing, produce cured ink compositions that result in clear images with good adhesion, rub and scratch resistance, and low migration.

As used herein, the term "viscosity" refers to a complex viscosity, which is the typical measurement provided by a mechanical rheometer that is capable of subjecting a sample to a steady shear strain or a small amplitude sinusoidal deformation. In this type of instrument, the shear strain is applied by the operator to the motor and the sample deformation (torque) is measured by the transducer. Examples of such instruments are the Rheometrics Fluid Rheometer RFS3, ARES rheometer, both made by Rheometrics, a division of TA Instruments, or a Haake Roto Visco 1 rheometer, Brookfield DV-E Viscometer made by AMETEK Brookfield and a TCP/P-Peltier Temperature Control Unit. The results are provided in centipoise (cP). In some embodiments, the radiation curable inkjet ink compositions exhibit a desirable combination of low viscosity in liquid form and high elongation once cured, i.e., they have a viscosity at 25° C. of less than 50 cPs, more preferably less than 30 cPs, even more preferably less than about 20 cPs, yet even more preferably less than about 10 cPs, yet even more preferably less than about 5 cPs, yet even more preferably less than about 4 cPs, yet even more preferably less than about 3 cPs, yet even more preferably less than about 2 cPs, yet even more preferably less than about 1 cPs, for example a viscosity from about 1 to about 5 cPs, preferably from about 2 to about 4 cPs.

The radiation curable inkjet ink compositions of the present disclosure provide suitable rub resistance after being cured. Inks exhibiting rub resistance exhibit improved processability, in which the printed substrate can be subjected to further processing without detrimental effect to the printed ink. Rub resistance may be analyzed for example with a Gakushin-type rubbing tester manufactured by Daiei Kagaku, based on reference standard JIS L-0849. The test typically involves placing a reference white cloth on rubbing heads of the rubbing tester. The rubbing heads exert pressure for a number of cycles on the cured ink due to their weight. Depending upon the rub resistance of the ink, the color of the ink will transfer to the reference cloth to a lesser or greater extent. The rub resistance is quantified by measuring the color difference $\Delta E$ after rubbing on the reference cloth by a Spectrophotometer, such as the X-Rite Ci64. The present radiation curable inkjet inks have $\Delta E$ value of less than 3.0, which is generally regarded as acceptable, preferably a $\Delta E$ value of less than 2.0, and even more preferably a $\Delta E$ value of less than 1.0.

Adhesion can be measured by a cross hatch adhesion tape test according to ASTM D3359 and quantified on a 0-5 scale. The radiation curable inkjet ink compositions provide advantageous adhesion properties on a variety of substrates, with adhesion performance ratings of 3 to 5, preferably 4 to 5.

The scratch resistance properties of the radiation curable inkjet ink compositions, after being cured, may be analyzed by pencil hardness tests, for example with standard ASTM3363-92a, and rated on a scale of softest to hardest: 6B, 5B, 4B, 3B, 2B, B, HB, F, H, 2H, 3H, 4H, 5H, 6H, 7H, 8H, 9H. In some embodiments, the radiation curable inkjet ink compositions provide suitable scratch resistance ratings of at least "B" hardness, preferably at least "HB", more preferably at least "F", even more preferably at least "H", yet even more preferably at least "2H".

Inks to be used on food packaging should not contaminate the food or impart any unnatural odor. Contamination, in this context, can result from migration of components of an ink into the foodstuff or other packaged material or from undesirable odors imparted to the packaged material by the ink. Migration of ink components into foodstuffs or pharmaceuticals may present a health risk and consequently should be kept to a minimum. Several food packaging regulations and guidelines exist which provide listings of acceptable ink components as well as stipulations regarding acceptable levels of migration (e.g., the European Printing Ink Association (EuPIA) and associated GMP guidelines EuPIA Inventory List 2012, Swiss Ordinance on Materials and Articles in Contact with Food, SR 817.023.21, Nestle Guidance Notes, FDA Title 21 CFR or FCN—Food Contact Notification). Specific migration limits (SML) of consumer product packaging inks are typically below 50 ppb and sometimes migration levels below 10 ppb are required.

The migration levels of the radiation curable inkjet ink compositions disclosed herein may be determined using migration testing standards known to those of ordinary skill in the art. Briefly, such analyses may involve stacking several sheets of printed samples, or alternatively cutting a printed sample from the rewind side of a substrate in a roll form web as the test specimen, and conditioning the test specimen in an extraction cell (generally ranging from 30 minutes to 2 days) filled with a food simulant (e.g., water, heptane, isooctane, vegetable oil, ethanol or acetic acid solutions, etc.) according to FDA "Conditions of Use" regulations as defined in Title 21 Code of Federal Regulations (C.F.R.) Section 176.170(c)-(d), Apr. 1, 2000, which specify the testing conditions (e.g., temperature and length of time) for which the test specimen is stored in the extraction cell depending on the intended use of a particular packaged product. After conditioning, any ink components from the test specimen may optionally be extracted with an extraction solvent (e.g., chloroform, methylene chloride). The levels of migration of the ink components may then be quantified with various analytical techniques, such as by weight, gas chromatography, liquid chromatography, mass spectrometry, elemental analysis, and the like. The exact technique used to measure the amount of migration will depend on the intended use of a particular packaged product. For example, if the package is intended to be used for frozen storage (no thermal treatment in the container), the migration is measured by condition of use "G" according to Table 2 of Title 21 Code of Federal Regulations (C.F.R.) Section 176.170(c) and Section 176.170(d). If the package has multiple intended uses, the package satisfies the migration level for the appropriate test for at least one of the intended uses.

In some embodiments, the radiation curable inkjet ink compositions disclosed herein exhibit a migration level of less than 50 ppb, preferably less than 40 ppb, preferably less than 30 ppb, preferably less than 20 ppb, more preferably less than 10 ppb, even more preferably less than 5 ppb, yet even more preferably less than 1 ppb, after being cured on an article. In some embodiments, the radiation curable inkjet ink compositions, after being cured, exhibit no migration and/or the ink components cannot be detected above the detection limit of the analytical technique employed.

In some embodiments, the radiation curable inkjet ink composition has a surface tension of at least about 20 mN/m, more preferably at least about 22 mN/m, and up to about 50 mN/m, preferably up to about 40 mN/m, more preferably up to about 30 mN/m at a jetting temperature of from about 25° C., preferably from about 35° C., more preferably from about 40° C. and less than about 100° C., preferably less than about 95° C., more preferably less than about 90° C.

For determining throw distance, a suitable bar code verifier may be used for assessing the grade of a bar code, for example, an Integra 9505 Barcode Quality Station. This equipment provides a bar code grading from A-F and 'no valid code' with A-C being an acceptable bar code and D, F and 'no valid code' being a low quality bar code. The radiation curable inkjet ink compositions preferably have a throw distance of at least about 1 mm, preferably at least about 1.5 mm, more preferably at least about 2 mm, and up to about 5 mm, preferably up to about 4 mm, more preferably up to about 3 mm using the thermal inkjet printing methods described herein. In some embodiments, the radiation curable inkjet ink compositions have a bar code grading of an A, B, or C, preferably A or B, at these throw distances above, allowing the radiation curable inkjet ink compositions to be printed on structured and three-dimensional substrates (e.g., grained, curved, and complex surfaces), in addition to flat substrates, without loss of image quality.

The radiation curable inkjet ink compositions disclosed herein also possess acceptable or excellent decap behavior (e.g., decap control, decap time, etc.) as measured by restarting printing and image clarity analysis (e.g., PIAS™-II) after exposing the ink to air for a particular decap time without loss of nozzles upon re-start. The inks are classified for decap time according to the following criteria in Table 1:

TABLE 1

| DECAP TIME | RATING |
| --- | --- |
| >30 MINUTES | EXCELLENT |
| 10-30 MINUTES | ACCEPTABLE |
| 1-<10 MINUTES | MARGINAL |
| <1 MINUTE | FAIL |

Additionally, the radiation curable inkjet ink compositions disclosed herein possess acceptable or excellent nozzle plate wetting grades as defined by sustainability of the ink during printing (Table 2). Printing continuously without loss of nozzles is defined as sustainability. Buildup of ink on a nozzle plate due to undesirable wetting will not allow sustained printing without wiping the excess ink off the nozzle plate. Since nozzle plate wetting can cause loss of nozzles in the print image, sustainability can be used as a measure of nozzle plate wetting. The inks are classified for nozzle plate wetting as measured by sustainability according to the following criteria:

TABLE 2

| SUSTAINABILITY | RATING |
| --- | --- |
| >1000 PRINTS | EXCELLENT |
| 500-1000 PRINTS | ACCEPTABLE |
| 100-<500 PRINTS | MARGINAL |
| <100 PRINTS | FAIL |

Printed Article

The radiation curable inkjet ink compositions can be cured on a substrate, which includes three dimensional parts as well as flat sheets or webs that are supplied in roll form, for the manufacture of printed articles having advantageous properties, such as printed articles that are rub and scratch resistant, have suitable ink adhesion, and migration levels of less than 10 ppb. Such printed articles may be suitable in the graphic arts, textiles, packaging, lottery, business forms and publishing industries, examples of which include a tag or label, a lottery ticket, a publication, packaging (e.g., flexible packaging), a folding carton, a rigid container (e.g., a plastic cup or tub, glass containers, metal cans, bottles, jars, and tubes), a point-of-sale display, and the like. In embodiments where electron beam curing is used, the depth of penetration of the electron beam radiation enables the radiation curable inkjet ink composition to be cured on substrates having various surface types, for example, a flat surface, a structured surface, such as grained surfaces, and a three-dimensional surface, such as curved and/or complex surfaces.

The radiation curable inkjet ink compositions may be printed on porous substrates, examples of which include, but are not limited to, paper, wood, membranes, and fabrics (including, for example, but not limited to, woven fabric, non-woven fabric, and foil-laminated fabric). The radiation curable inkjet ink compositions may also be printed on non-porous substrates, for example, various plastics, glass, metals, and/or coated papers. These may include, but are not limited to, molded plastic parts as well a flat sheets or rolls of plastic films. Examples include those containing polyethylene terephthalate (PET), biaxially oriented polystyrene (OPS), polyethylene (PE), polypropylene (PP), oriented polypropylene (OPP), polylactic acid (PLA), oriented nylon, polyvinyl chloride (PVC), polyester, cellulose triacetate (TAC), polycarbonate, polyolefin, acrylonitrile butadiene styrene (ABS), polyacetal and polyvinyl alcohol (PVA), and the like.

The radiation curable inkjet ink compositions disclosed herein are advantageously used for printing flexible packaging, preferably food/product packaging (e.g., primary, secondary, or tertiary food packaging) which may contain food products, non-food products, pharmaceutical, and/or personal care items, due to the ability to cure the radiation curable inkjet ink composition with electron beam radiation with minimal heat and substrate distortion, suitable adhesion, and preferably a migration of less than 10 ppb of the cured ink composition into the packaged product/item.

Method of Forming an Image

With inkjet printing, a desired printed image is formed when a precise pattern of dots is ejected from a drop-generating device, known as a printhead, onto a print medium. The printhead has an array of precisely formed nozzles located on a nozzle plate and attached to an inkjet printhead substrate. The inkjet printhead substrate incorporates an array of firing chambers that receive inkjet ink through fluid communication with one or more ink reservoirs. Each firing chamber has a resistor element, known as a firing resistor, located opposite the nozzle so that the inkjet ink collects between the firing resistor and the nozzle. Each resistor element is typically a pad of a resistive material and measures for example about 35 µm×35 µm. The printhead is held and protected by an outer packaging referred to as a print cartridge or an inkjet pen. Upon energizing of a particular resistor element, a droplet of inkjet ink is expelled through the nozzle toward the print medium. The firing of ink droplets is typically under the control of a microprocessor, the signals of which are conveyed by electrical traces to the resistor elements, forming alphanumeric and other image patterns on the print medium. Since the nozzles are small, typically 10 µm to 40 µm in diameter, inks that minimize clogging are desired.

The present disclosure provides a method of forming an image by applying the radiation curable inkjet ink composition, in one or more of its embodiments, onto a surface of a substrate by a thermal inkjet printhead and exposing the radiation curable inkjet ink composition to electron beam radiation or actinic radiation, preferably electron beam radiation, to at least partially cure the radiation curable inkjet ink composition, preferably to substantially cure the radiation curable inkjet ink composition, to form a cured ink composition on the surface of the substrate. Use of the radiation curable inkjet ink compositions and methods described herein overcomes and/or mitigates at least some of the problems associated with thermal inkjet processes described above, advantageously resulting in reliable and improved print quality.

Any drop on demand printhead known to those of ordinary skill in the art of inkjet printing can be used as printing units in the present method, including continuous printheads, thermal printheads, electrostatic printheads, and acoustic printheads, preferably a thermal printhead (having a thermal transducer) is used. Typical parameters, such as, for example, drop speed, printhead temperature, control voltage and control pulse width, can be adjusted according to the specification of the printhead. Printheads which are generally suitable for usage in the methods herein have a droplet size in the range of 2 to 80 pL and a droplet frequency in the range of 10 to 100 kHz, although values above or below these ranges may also be used. Particularly advantageous printing results are obtained by setting the voltage to 8.0-9.0 Volts and the pulse width to 1.0-2.5 microseconds.

In some embodiments, one or more radiation curable inkjet ink compositions are thermally jetted onto the desired substrate at temperatures of less than about 100° C., such as from about 25° C. to about 100° C., preferably about 30° C. to about 90° C., more preferably about 35° C. to about 70° C., more preferably 40-45° C.

After applying the radiation curable inkjet ink composition onto the substrate, the radiation curable inkjet ink composition can be cured by exposing to actinic radiation and/or by electron beam radiation, preferably electron beam radiation. In some embodiments, the radiation curable inkjet ink composition includes a photoinitiator, and is cured using actinic radiation, preferably UV radiation, preferably UV radiation having a wavelength of 200-400 nm. In preferred embodiments, the radiation curable inkjet ink composition is substantially free of a photoinitiator and is cured by exposure to electron beam radiation. In electron beam curing methods, electrons emerge from a vacuum chamber through a metal foil and reach the radiation curable inkjet ink composition on the substrate in a reaction chamber. Electron beam curing processes typically generate little heat and thus help prevent substrate distortion from thermal processing or processes requiring raised temperatures. The radiation curable inkjet ink compositions may be exposed to electron beams using any electron beam generator, such as electron beam generators available from Electron Crosslinking AB (Sweden), Comet AG (Switzerland) or Energy Sciences, Inc. (ESI) (USA). The electron beam generator may be arranged in combination with the printhead of the inkjet printer, so that the radiation curable inkjet ink composition is exposed to curing radiation shortly after being jetted.

In some embodiments, the radiation curable inkjet ink composition is exposed to a low dose of electron beam radiation to form an image, such as from about 0.1 Mrad, preferably from about 0.2 Mrad, preferably from about 0.3 Mrad, preferably from about 0.4 Mrad, preferably from about 0.5 Mrad, and up to about 1.3 Mrad, preferably up to about 1.2 Mrad, preferably up to about 1.1 Mrad, or more preferably up to about 1.0 Mrad. In some embodiments, an image is formed by exposing the radiation curable inkjet ink composition to a higher dose of electron beam radiation, for example, from about 1 Mrad, preferably from about 1.2 Mrad, preferably from about 1.5 Mrad, preferably from about 1.6 Mrad, preferably from about 1.7 Mrad, up to about 10 Mrad, preferably up to about 8 Mrad, preferably up to about 6 Mrad, or more preferably up to about 3 Mrad, or a combination of low dose and high dose electron beam radiation. The dose of electron beam radiation can be adjusted based on the desired level of curing. For example, when partial curing is desired, a low dose of electron beam radiation may be employed over a short exposure time, whereas substantial curing may be accomplished by increasing the electron beam dosage and exposure time.

Various electron beam accelerating potentials may be employed in the methods disclosed herein, however, an accelerating potential of less than 300 kV is typically used, preferably less than 260 kV, more preferably less than 240 kV, more preferably less than 220 kV, for example in the range of about 70 to about 200 kV.

The method of the present disclosure may optionally include supplying an inert gas during electron beam curing to displace oxygen ("inerting") which inhibits free-radical polymerization. In some embodiments, less than about 200 ppm, preferably less than about 180 ppm, preferably less than about 160 ppm, preferably less than about 140 ppm oxygen is present in the reaction chamber during curing.

Any suitable inert gas may be used including, but not limited to, nitrogen gas and argon gas.

Further, it is noted that after application of the radiation curable inkjet ink composition, a drying step is optional, i.e., no drying step is required in the methods herein, as the radiation curable inkjet ink composition of the present disclosure is preferably non-aqueous. When the methods involve a drying step, the applied radiation curable inkjet inks may be dried for about 10 seconds or less, preferably about 7 seconds or less, more preferably about 4 seconds or less, even more preferably about 2 seconds or less, yet even more preferably about 1 second or less, under ambient conditions, prior to application of another coating of ink or prior to exposing to curing radiation (e.g., electron beam radiation). In a preferred embodiment, there is no drying time in between application of the radiation curable inkjet ink to the substrate and the curing step, other than the amount of time it takes to deliver the substrate from the inking station (i.e., the thermal inkjet printer) to the curing station (e.g., the electron beam generator).

It should also be recognized that substrate surface treatments such as corona treatment, atmospheric plasma treatment, and flame treatment may optionally be employed in the methods herein prior to application of the radiation curable inkjet ink compositions to improve printed article characteristics, for example ink adhesion. The parameters of such substrate surface treatments may be varied greatly depending on the substrate material to be printed, the specific radiation curable inkjet ink compositions utilized, the printing method applied, and the desired properties and applications of the printed article.

Ink tank

The radiation curable inkjet ink compositions disclosed herein may be stored and/or sold in an ink tank (i.e., reservoir). When in use, the ink tank is fluidly connected to the printhead so that the ink may be drawn into the printhead for a printing operation. The ink tank can include the radiation curable inkjet ink compositions disclosed herein, in one or more embodiments, as a pre-mixed composition, or alternatively the ink tank can store one or more of the ink components separately, and the separate ink components can be drawn into the printhead just prior to application, where they are mixed. Further, the ink tank may be configured to integrally mount on a carriage of a carriage printer, so that the printhead needs to be replaced when the ink is depleted. Preferably, the ink tank can be detachably mounted to a holding receptacle in the printhead so that only the ink tank itself needs to be replaced when the ink is depleted.

Figure 2:
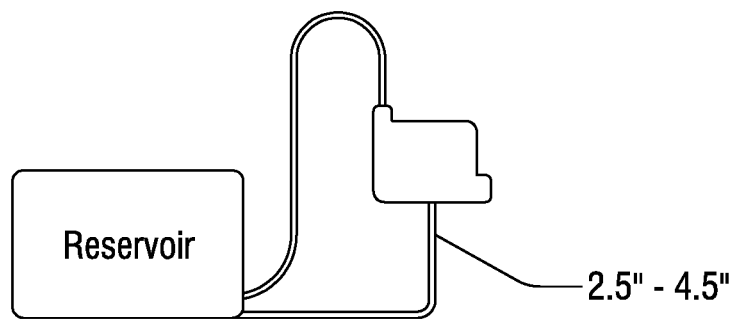
FIG. 2 is an illustration of bulk supply station for horizontal (case coding) applications.

A suitable example is the Bulk Supply Station made by Kao Collins Inc. as illustrated in FIGS. 1 and 2. In exemplary vertical (printing down/mailing) applications, the bulk ink reservoir is mounted so that the silver barb out ports are 3" (±1") below the cartridge nozzles. Altitude and atmospheric pressure can influence the exact height of the reservoir, so slight adjustments may need to be made, for example, in ¼" increments (FIG. 1). In exemplary horizontal (case coding) applications, the bulk ink reservoir is mounted so that the silver barb out ports are 2.5"-4.5" below the bottom of the lowest print cartridge. Up to four cartridges can be fed from one bulk reservoir. Altitude and atmospheric pressure can influence the exact height of the reservoir, so slight adjustments may need to be made, for example, in ¼" increments (FIG. 2). Various other configurations and modifications of the ink tank are also possible and the invention may be practiced otherwise than as explicitly described here.

The examples below are intended to further illustrate radiation curable inkjet ink compositions and are not intended to limit the scope of the claims.

EXAMPLES

Examples 1-6 (Inventive)

Preparation of radiation curable inkjet ink compositions:

All ingredients are added to a stainless steel container and mixed with a sawtooth blade at 500 rpm for 30 minutes. The ink is then filtered through a 1 micron filter.

TABLE 3

| | Ink formulations of Examples 1-6 (based on wt. % of raw materials) | | | | | | | |
|---|---|---|---|---|---|---|---|---|
| Component Identity | | Materials: Trade name and Description | Ex 1 % | Ex 2 % | Ex 3 % | Ex 4 % | Ex 5 % | Ex 6 % |
| (A) | CN3100 | Mono-ethylenically unsaturated oligomer | 15.0 | 15.0 | 15.0 | 15.0 | 15.0 | 14.0 |
| (B) | SR420 | Mono-ethylenically unsaturated monomer-TMCH Acrylate | 35.0 | 30.0 | 25.0 | 27.0 | 34.0 | 31.0 |
| (C) | Methanol | Solvent | 40.0 | 40.0 | 40.0 | 42.0 | 40.0 | 41.0 |
| (C) | Ethanol | Solvent | 10.0 | 10.0 | 10.0 | 13.0 | 10.0 | 13.0 |
| (D1) | SR9003B | Poly-ethylenically unsaturated monomer: PONPGD ACRYLATE | — | — | 10.0 | — | — | — |
| (D2) | CN966J75 | Poly-ethylenically unsaturated oligomer | — | — | — | 3.0 | — | — |
| (E) | ACE | Acrylic Ester of carboxylic acid ester | — | 5.0 | — | — | — | — |
| (F) | EDTMPA* | Anti-kogation agent | — | — | — | — | 1.0 | 1.0 |
| | | Total % | 100.0 | 100.0 | 100.0 | 100.0 | 100.0 | 100.0 |

*EDTMPA = Ethylene Diamine Tetramethylene Phosphonic Acid

Examples 7-10 (Inventive)

Preparation of radiation curable inkjet ink compositions:

All ingredients were added to a stainless steel container and mixed with a sawtooth blade at 500 rpm for 30 minutes. The ink was then filtered through a 1 micron filter.

TABLE 4

Ink formulations of Examples 7-10 (based on wt. % active ingredient in raw materials)

| Component Identity | Raw Materials: Trade name and Description | | Ex 7 (220-124-3) % | Ex 8 (208-104-1) % | Ex 9 (208-104-4) % | Ex 10 (208-104-2) % |
|---|---|---|---|---|---|---|
| (A) | CN3100 | Mono-ethylenically unsaturated oligomer | 14.55 | 14.55 | 14.55 | 14.55 |
| (B) | TMCHA | Mono-ethylenically unsaturated monomer | 33.95 | 33.95 | 33.95 | 33.95 |
| (C) | Ethanol | Solvent | 9.70 | 38.50 | 24.25 | 33.50 |
| (C) | Methanol | Solvent | 38.80 | — | — | — |
| (C) | Acetone | Solvent | — | 10.00 | 24.25 | 15.00 |
| (D1), (G) | 20% carbon black dispersion in PONPGDA* | Colorant dispersion in poly-ethylenically unsaturated monomer | 3.00 | 3.00 | 3.00 | 3.00 |
| | | Total % | 100.00 | 100.00 | 100.00 | 100.00 |
| | | B/A ratio | 2.33 | 2.33 | 2.33 | 2.33 |
| | | (B + D)/A ratio | 2.50 | 2.50 | 2.50 | 2.50 |

*Dispersion includes 20 wt. % carbon black pigment (G) and 80 wt. % PONPGDA monomer (D1)

Examples 11-13 (Comparative)

Preparation of comparative radiation curable inkjet ink compositions (220-124-5, 208-104-8, and 208-104-9) were prepared in the same manner as the radiation curable inkjet ink compositions of Examples 7-10.

TABLE 5

Ink formulations of Examples 11-13 (based on wt. % active ingredient in raw materials)

| Component Identity | Raw Materials: Trade name and Description | | Ex 11 (220-124-5) % | Ex 12 (208-104-8) % | Ex 13 (208-104-9) % |
|---|---|---|---|---|---|
| (A) | CN3100 | Mono-ethylenically unsaturated oligomer | 29.10 | 39.10 | 36.50 |
| (B) | TMCHA | Mono-ethylenically unsaturated monomer | 19.40 | 9.40 | 12.00 |
| (C) | Ethanol | Solvent | 9.70 | 9.70 | 9.70 |
| (C) | Methanol | Solvent | 38.80 | 38.80 | 38.80 |
| (C) | Acetone | Solvent | — | — | — |
| (D1), (G) | 20% carbon black dispersion in PONPGDA* | Colorant dispersion in poly-ethylenically unsaturated monomer | 3.00 | 3.00 | 3.00 |
| | | Total % | 100.00 | 100.00 | 100.00 |
| | | B/A ratio | 0.67 | 0.24 | 0.33 |
| | | (B + D)/A ratio | 0.75 | 0.30 | 0.39 |

*Dispersion includes 20 wt. % carbon black pigment (G) and 80 wt. % PONPGDA monomer (D1)

Decap Testing

Inks from Examples 7-9 (inventive) and Examples 11-13 (comparative) were tested for decap behavior by exposing the respective inks to air for a particular decap time, then restarting printing and image clarity analysis using Personal Image Analysis System™-II (PIAS™-II), available from Quality Engineering Associates (QEA), Massachusetts, USA. Inks were categorized by the amount of time they can be exposed to air without loss of nozzles upon re-start using the categories from Table 1. The results are displayed in Table 6.

TABLE 6

| | Decap time classification | | | | | |
|---|---|---|---|---|---|---|
| | Inventive | | | Comparative | | |
| | Ex 7 (220-124-3) | Ex 8 (208-104-1) | Ex 9 (208-104-4) | Ex 11 (220-124-5) | Ex 12 (208-104-8) | Ex 13 (208-104-9) |
| B/A ratio | 2.33 | 2.33 | 2.33 | 0.67 | 0.24 | 0.33 |
| (B + D)/A ratio | 2.50 | 2.50 | 2.50 | 0.75 | 0.30 | 0.39 |
| Decap Time Classification | Excellent | Acceptable | Excellent | Marginal | Fail | Fail |

Nozzle Plate Wetting Testing

Inks from Examples 7, 8, and 10 (inventive) and Example 12 (comparative) were tested for nozzle plate wetting based on the following sustainability performance test:

The respective inks were used to print continuously, and the total number of prints before a loss of nozzles was recorded. Nozzle loss was determined using Personal Image Analysis System™-II (PIAS™-II), available from Quality Engineering Associates (QEA), Massachusetts, USA. The inks were then classified based on the number of sheets produced prior to nozzle loss using the categories defined in Table 2. The results are displayed in Table 7.

TABLE 7

Nozzle plate wetting classification

| | Inventive | | | Comparative |
|---|---|---|---|---|
| | Ex 7 (220-124-3) | Ex 8 (208-104-1) | Ex 10 (208-104-2) | Ex 12 (208-104-8) |
| B/A ratio | 2.33 | 2.33 | 2.33 | 0.24 |
| (B + D)/A ratio | 2.50 | 2.50 | 2.50 | 0.30 |
| Nozzle Plate Wetting | Acceptable | Excellent | Excellent | Marginal |

Where a numerical limit or range is stated herein, the endpoints are included. Also, all values and subranges within a numerical limit or range are specifically included as if explicitly written out.

As used herein the words "a" and "an" and the like carry the meaning of "one or more."

Obviously, numerous modifications and variations of the present invention are possible in light of the above teachings. It is therefore to be understood that, within the scope of the appended claims, the invention may be practiced otherwise than as specifically described herein.

All patents and other references mentioned above are incorporated in full herein by this reference, the same as if set forth at length.

The invention claimed is:

1. A radiation curable inkjet ink composition, comprising:
(A) a mono-ethylenically unsaturated oligomer, wherein the mono-ethylenically unsaturated oligomer (A) is present in an amount of from 8 to 30 wt. %, based on a total weight of the radiation curable inkjet ink composition;
(B) a mono-ethylenically unsaturated monomer, wherein the mono-ethylenically unsaturated monomer (B) is present in an amount of from 20 to 50 wt. %, based on a total weight of the radiation curable inkjet ink composition; and
(C) a solvent;
wherein the radiation curable inkjet ink composition is substantially free of a photoinitiator;
wherein a total weight of the mono-ethylenically unsaturated oligomer (A) is less than or equal to a total weight of the mono-ethylenically unsaturated monomer (B), and
wherein a weight ratio of the mono-ethylenically unsaturated monomer (B) to the mono-ethylenically unsaturated oligomer (A) is 1:1 to 3:1.

2. The radiation curable inkjet ink composition of claim 1, wherein the solvent (C) is present in an amount of from 30 to 65 wt. %, based on a total weight of the radiation curable inkjet ink composition.

3. The radiation curable inkjet ink composition of claim 1, wherein the solvent (C) is an organic solvent, or a mixture of at least two organic solvents.

4. The radiation curable inkjet ink composition of claim 1, further comprising (D) a poly-ethylenically unsaturated component.

5. The radiation curable inkjet ink composition of claim 4, wherein the poly-ethylenically unsaturated component (D) is present in an amount of from 1 to 20 wt. %, based on a total weight of the radiation curable inkjet ink composition.

6. The radiation curable inkjet ink composition of claim 4, wherein a weight ratio of the combined weight of the mono-ethylenically unsaturated monomer (B) and the poly-ethylenically unsaturated component (D) to the mono-ethylenically unsaturated oligomer (A) ((B+D)/A) is greater than 1:1 and up to 4:1.

7. The radiation curable inkjet ink composition of claim 4, wherein the poly-ethylenically unsaturated component (D) is a poly-ethylenically unsaturated monomer (D1), a poly-ethylenically unsaturated oligomer (D2), or a mixture thereof.

8. The radiation curable inkjet ink composition of claim 1, further comprising (E) an acrylate ester of a carboxylic acid ester of the following formula (I)

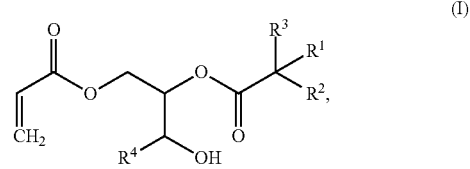

wherein $R^1$, $R^2$, and $R^3$ are each independently an alkyl, an aryl, an alkylaryl, an alkoxyaryl, or a cycloaliphatic group having 1 to 10 carbon atoms, and $R^4$ is a group selected from hydrogen, methyl, ethyl, propyl, butyl, pentyl, hexyl, heptyl, octyl, nonyl, decyl, phenyl, and alkoxy phenyl.

9. The radiation curable inkjet ink composition of claim 8, wherein the acrylate ester of a carboxylic acid ester of the formula (I) (E) is present in an amount of from 0.5 to 15 wt. %, based on a total weight of the radiation curable inkjet ink composition.

10. The radiation curable inkjet ink composition of claim 8, wherein $R^1$ and $R^2$ combined have 6 to 8 carbon atoms, $R^3$ is methyl, and $R^4$ is hydrogen.

11. The radiation curable inkjet ink composition of claim 8, wherein a combined weight of the mono-ethylenically unsaturated oligomer (A) and the acrylate ester of a carboxylic acid ester of the formula (I) (E) is less than or equal to a total weight of the mono-ethylenically unsaturated monomer (B).

12. The radiation curable inkjet ink composition of claim 1, further comprising (F) an anti-kogation agent.

13. The radiation curable inkjet ink composition of claim 1, further comprising:
(G) a colorant,
at least one additive (H) selected from the group consisting of a surfactant, a stabilizer, an adhesion promoter, and a security taggant, or
a combination thereof.

14. The radiation curable inkjet ink composition of claim 1, which exhibits a migration level of less than 10 ppb after being cured on an article.

15. A printed article, comprising:
a substrate and a cured ink composition on the substrate, wherein the cured ink composition is Ruined from the radiation curable inkjet ink composition of claim 1.

16. A method of forming an image on a substrate, comprising:

applying a radiation curable inkjet ink composition onto a surface of the substrate by a thermal inkjet printhead, wherein the radiation curable inkjet ink composition comprises:

(A) a mono-ethylenically unsaturated oligomer, wherein the mono-ethylenically unsaturated oligomer (A) is present in an amount of from 8 to 30 wt. %, based on a total weight of the radiation curable inkjet ink composition;

(B) a mono-ethylenically unsaturated monomer, wherein the mono-ethylenically unsaturated monomer (B) is present in an amount of from 20 to 50 wt. %, based on a total weight of the radiation curable inkjet ink composition; and (C) a solvent, wherein the radiation curable inkjet ink composition is substantially free of a photoinitiator, wherein a total weight of the mono-ethylenically unsaturated oligomer (A) is less than or equal to a total weight of the mono-ethylenically unsaturated monomer (B); and wherein a weight ratio of the mono-ethylenically unsaturated monomer (B) to the mono-ethylenically unsaturated oligomer (A) is 1:1 to 3:1, and exposing the radiation curable inkjet ink composition to electron beam radiation to at least partially cure the radiation curable inkjet ink composition to form a cured ink composition on the surface of the substrate.

17. An ink tank, comprising the radiation curable inkjet ink composition of claim 1.

18. The radiation curable inkjet ink composition of claim 1, wherein the mono-ethylenically unsaturated oligomer (A) is at least one selected from the group consisting of an acrylate or methacrylate having a straight chain or branched chain, a cyclic alkyl alcohol, and an aromatic acrylic oligomer.

19. The radiation curable inkjet ink composition of claim 1, wherein the mono-ethylenically unsaturated monomer (B) is at least one selected from the group consisting of an acrylate ester monomer having hydroxyl functionality, an aliphatic or aromatic acrylate ester monomer, and a vinyl ether monomer.

20. The radiation curable inkjet ink composition of claim 19, wherein the aliphatic or aromatic acrylate ester monomer is at least one selected from the group consisting of an acrylate and (meth)acrylate having a straight chain or a branched chain and a cyclic alkyl alcohol.

21. The radiation curable inkjet ink composition of claim 20, wherein the cyclic alkyl alcohol comprises from 1 to 20 carbon atoms.

* * * * *